United States Patent
Young et al.

(10) Patent No.: US 11,093,726 B2
(45) Date of Patent: Aug. 17, 2021

(54) OPTICAL READING OF A SECURITY ELEMENT

(71) Applicant: QUANTUM BASE LIMITED, Stockport (GB)

(72) Inventors: Robert James Young, Stockport (GB); Utz Alfred Fritz Roedig, Stockport (GB)

(73) Assignee: QUANTUM BASE LIMITED, Stockport (GB)

( * ) Notice: Subject to any disclaimer, the term of this patent is extended or adjusted under 35 U.S.C. 154(b) by 0 days.

(21) Appl. No.: 16/637,388

(22) PCT Filed: Feb. 19, 2018

(86) PCT No.: PCT/GB2018/050424
§ 371 (c)(1),
(2) Date: Feb. 7, 2020

(87) PCT Pub. No.: WO2019/038511
PCT Pub. Date: Feb. 28, 2019

(65) Prior Publication Data
US 2020/0302136 A1 Sep. 24, 2020

(30) Foreign Application Priority Data
Aug. 24, 2017 (GB) .................................. 1713634

(51) Int. Cl.
*G06K 7/14* (2006.01)
*G06K 7/12* (2006.01)
(Continued)

(52) U.S. Cl.
CPC ............. *G06K 7/1417* (2013.01); *G06K 7/12* (2013.01); *G06K 9/00577* (2013.01);
(Continued)

(58) Field of Classification Search
None
See application file for complete search history.

(56) References Cited

U.S. PATENT DOCUMENTS

| 2004/0112962 A1 | 6/2004 | Farrall et al. |
| 2008/0038494 A1 | 2/2008 | Midgley et al. |
| (Continued) | | |

FOREIGN PATENT DOCUMENTS

| GB | 2537543 A | 10/2016 |
| GB | 2543125 A | 4/2017 |
| (Continued) | | |

OTHER PUBLICATIONS

GB Search and Examination Report for corresponding GB Application No. 1713634.2 dated Sep. 27, 2017, 3 pages.
(Continued)

*Primary Examiner* — Kristy A Haupt
(74) *Attorney, Agent, or Firm* — Hoffman Warnick LLC

(57) ABSTRACT

According to a first aspect of the present invention, there is provided a method of determining a unique identifier for a security element, the method comprising: optically reading the security element, the security element comprising a number of emitters that are each capable of exhibiting a different emission response to excitation of the number of emitters; the reading comprising determining data indicative of an optical property of the security element using first emission electromagnetic radiation, emitted in response to first excitation of the number of emitters, and determining data indicative of an optical property of the security element using second emission electromagnetic radiation, emitted in response to second, different, excitation of the number of emitters; and the unique identifier being determined from a
(Continued)

Figure 1:
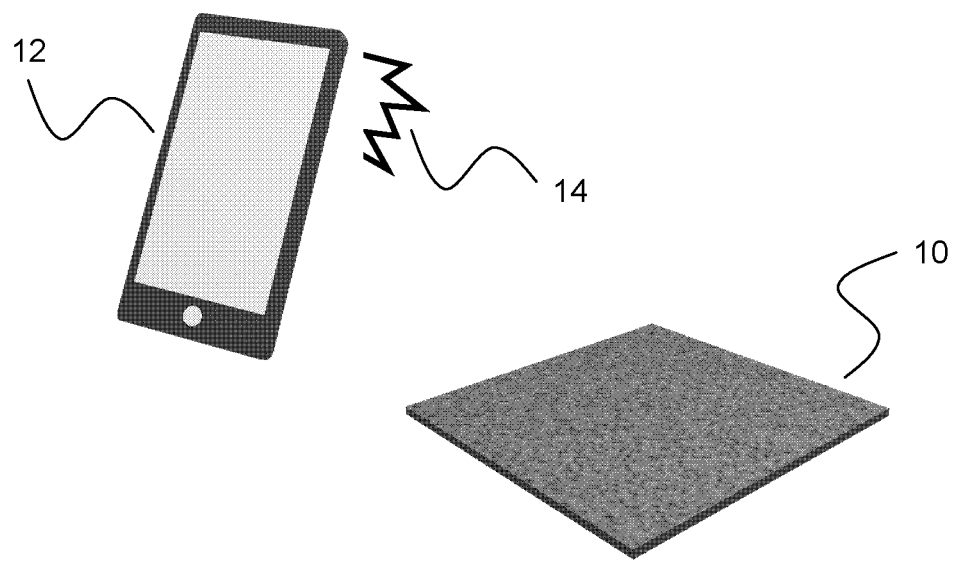

map of a variation in determined data indicative of an optical property with respect to the excitation of the number of emitters.

20 Claims, 12 Drawing Sheets

(51) Int. Cl.
*G06K 9/00* (2006.01)
*G06K 19/06* (2006.01)
(52) U.S. Cl.
CPC ... *G06K 19/0614* (2013.01); *G06K 19/06037* (2013.01); *G06K 2009/0059* (2013.01)

(56) References Cited

U.S. PATENT DOCUMENTS

2014/0055824 A1    2/2014  Tremolada et al.
2017/0186262 A1*   6/2017  Celante ................ G07D 7/2041

FOREIGN PATENT DOCUMENTS

WO    2015121841 A1    8/2015
WO    2016120608 A1    8/2016

OTHER PUBLICATIONS

International Search Report for corresponding PCT Application No. PCT/GB2018/050424 dated Apr. 25, 2018, 4 pages.

* cited by examiner

OPTICAL READING OF A SECURITY ELEMENT

The present invention relates generally to the optical reading of a security element, and in particular to related methods and systems for determining or authenticating a unique identifier for such an optically read security element.

There is often a need to prove, or disprove, the authenticity of an object or similar. For instance, this might be needed for security purposes, for example to allow or prevent access to certain functionality associated with the object, or simply to allow a user or consumer of the object to be satisfied that they are using an authentic object. It will be appreciated that such tests for authenticity find use in the fields of anti-counterfeiting, security and so on.

In order to be able to prove that an object is an authentic object, or in other words to authenticate an object, that object might be provided with a unique identifier in one form or another. "Unique" might not necessarily mean that it is impossible for another object to have the same identifier, but instead that it is statistically highly unlikely for this to be the case, or in other words for the identifier to be accidentally stumbled across by guesswork or simple trial and error. The very same "uniqueness" might be used in other ways, too, for example for highly targeted marketing or data acquisition with respect to the object or a user or consumer of that object.

A unique identifier might, for example, take the form of or be derived from a physical (sometimes referred to as physically) unclonable function. This might be in the form of a device or other element, the properties of which depend on small variations in construction or fabrication or similar, but which nevertheless can be used to provide a unique identifier. For instance, in a vast array of memory cells, a certain number of memory cells may be defective, and this number or arrangement of defective cells will be different for different arrays that are produced. Thus, this is a simple example of a unique identifier. Another example might be, for instance, a capacitance or resistance of an electrical component, based on the thickness of layers within that component, or the extent of those layers, and so on. Due to tolerances in manufacturing, each component will likely have a slightly different construction, and so a slightly different, and unique, electrical property.

Unique identifiers do not necessarily need to be based on electrical principles. For instance, physical unclonable functions may be probed or otherwise challenged optically in order to determine a unique identifier. For instance, the way in which one or more optical emitters are provided on an object may, as above, yield an overall emission spectrum or map which is unique, again providing a readable unique identifier.

Traditionally, the generation of unique identifiers, and/or associated use of physical unclonable functions, have been based on macroscopic effects. More recently though, it has been proposed to incorporate quantum mechanical effects in the generation of unique identifiers. In these more recent examples, for instance, an electrical component exhibiting quantum mechanical confinement (e.g. a resonant tunnelling diode) may be used as a quantum mechanical based physical unclonable function. The electrical properties of such a device or structure, and thus the unique identifier, are based on quantum mechanical principles. Similarly, optical based physical unclonable functions may be based on the emissions spectra of quantum dots, or 2-D materials, or similar, located on an object. In both cases, it may be extremely difficult, if not impossible, to be able to physically copy a security element (e.g. being or comprising a physical unclonable function) based on quantum mechanical effects. This is to the extent that the unique identifier provided by such an element may not be circumvented, and certainly not in any practical time frame.

Depending on the exact implementation, it might be relatively straightforward to be able to determine (e.g. for the first time, or subsequently, in order to cross-check) a unique identifier based on electrical principles. However, the same cannot necessarily be said for optical-based security elements, for example those security elements that are optically read in order to determine a unique identifier. Whilst it may be relatively easy to optically determine a unique identifier in a laboratory environment, or a highly controlled environment, it will be very difficult, if not impossible, to be able to quickly, or easily, or cheaply do this in a more commercial environment, for example with a typical consumer-like device or a consumer-like environment. Even if it is possible to determine a unique identifier using a more commercial, end-user, device, current approaches or proposals for such use may not offer satisfactory levels of such convenience, determination, or related cross-checking for authentication, or related security functionality.

It is an example aim or example embodiments of the present invention to at least partially overcome or avoid one or more disadvantages of the prior art, whether identified herein or elsewhere, or to at least provide a viable alternative.

According to the present invention there are provided apparatus and methods as set forth in the claims that follow. Other features of the invention will be apparent from the dependent claims, and the description which follows.

According to a first aspect of the present invention, there is provided a method of determining a unique identifier for a security element, the method comprising: optically reading the security element, the security element comprising a number of emitters that are each capable of exhibiting a different emission response to excitation of the number of emitters; the reading comprising determining data indicative of an optical property of the security element using first emission electromagnetic radiation, emitted in response to first excitation of the number of emitters, and determining data indicative of an optical property of the security element using second emission electromagnetic radiation, emitted in response to second, different, excitation of the number of emitters; and the unique identifier being determined from a map of a variation in determined data indicative of an optical property with respect to the excitation of the number of emitters.

In a preferred example, this aspect might be a method of determining a unique identifier for a security element, the method comprising: optically reading the security element using excitation electromagnetic radiation directed at the security element, the security element comprising a number of emitters that are each capable of exhibiting a different emission response to the electromagnetic excitation radiation; the reading comprising determining data indicative of an optical property of the security element using first emission electromagnetic radiation, emitted in response to first excitation electromagnetic radiation, and determining data indicative of an optical property of the security element using second emission electromagnetic radiation, emitted in response to second, different, excitation electromagnetic radiation; and the unique identifier being determined from a map of a variation in determined data indicative of an optical property with respect to the excitation electromagnetic radiation.

The method may be undertaken, and the map established, for different locations on the security element, and/or for different emitters of the security element.

The first excitation and the second excitation radiation might be undertaken electrically, and optionally have one or more of a different: intensity, power, energy, voltage, or current.

The first excitation and the second excitation radiation might be undertaken optically, and optionally using excitation electromagnetic radiation directed at the security element.

The first excitation and/or the second excitation might comprise excitation electromagnetic radiation directed at the security element. First excitation electromagnetic radiation and second excitation electromagnetic radiation might: have a different intensity; and/or have a different intensity and comprise substantially the same wavelength or wavelengths, frequency or frequencies, energy or energies, polarisation or polarisations; and/or have a different intensity and originate from the same electromagnetic radiation source, configurable to emit at different intensities.

The first and second excitation electromagnetic radiation might originate from: one or more radiation sources, controllable to actively select an intensity of the excitation electromagnetic radiation; and/or different times in a time-varying source of excitation electromagnetic radiation.

The data indicative of an optical property of the security element might comprise one or more of: an actual optical property; and/or an electromagnetic emission spectrum of at least a part of the security element; and/or a peak, trough, gradient, saturation point, or point of inflection in an electromagnetic emission spectrum of at least a part of the security element; and/or a physical location in relation to the security element of an actual optical property; and/or a physical location of a peak, trough, gradient, saturation point, or point of inflection in an electromagnetic emission spectrum of the security element in relation to the security element; and/or a delay in radiation being emitted.

The security element might comprise one or more continuous or discrete components exhibiting quantum mechanical confinement, the or each component being capable of emitting electromagnetic radiation linked to that quantum mechanical confinement, in response to the excitation, wherein the confinement of the one or more continuous or discrete components optionally confines in one or more of 3D, 2D, or 1D, or 0D.

The reading might be undertaken for multiple locations across the security element at the or each excitation electromagnetic radiation, such that the map is a map of the variation in determined data indicative of an optical property across the security element with respect to the excitation electromagnetic radiation, and optionally wherein the reading for multiple locations across the security element is undertaken in a single reading step, using a reader with a two-dimensional sensor.

Optically reading the security element might be undertaken via an optical filter.

According to a second aspect of the present invention, there is provided a system for determining a unique identifier for a security element, the system comprising: one or more excitation sources for generating a first excitation and a second, different excitation, for use with the security element the security element comprising a number of emitters that are each capable of exhibiting a different emission response to the excitation of the number of emitters; an optical reader, for optically reading the security element by determining data indicative of an optical property of the security element using first emission electromagnetic radiation, emitted in response to first excitation of the number of emitters, and by determining data indicative of an optical property of the security element using second emission electromagnetic radiation, emitted in response to second, different, excitation of the number of emitters; the unique identifier being determined from a map of a variation in determined data indicative of an optical property with respect to the excitation.

In a preferred example, this aspect might be a system for determining a unique identifier for a security element, the system comprising: one or more electromagnetic radiation sources for generating first excitation electromagnetic radiation and second, different excitation radiation, for directing at the security element, the security element comprising a number of emitters that are each capable of exhibiting a different emission response to the electromagnetic excitation radiation; an optical reader, for optically reading the security element by determining data indicative of an optical property of the security element using first emission electromagnetic radiation, emitted in response to first excitation electromagnetic radiation, and by determining data indicative of an optical property of the security element using second emission electromagnetic radiation, emitted in response to second, different, excitation electromagnetic radiation; the unique identifier being determined from a map of a variation in determined data indicative of an optical property with respect to the excitation electromagnetic radiation.

According to a third aspect of the present invention, there is provided a method of authenticating, comprising: optically reading a security element, the security element comprising a number of emitters that are each capable of exhibiting a different emission response to excitation of the number of emitters; the reading comprising determining data indicative of an optical property of the security element using first emission electromagnetic radiation, emitted in response to first excitation of the number of emitters; the authenticating further comprising comparing the determined data indicative of an optical property with the unique identifier determined using the method of the first aspect, or using the system of the second aspect.

In a preferred example, this aspect might be a method of authenticating, comprising: optically reading a security element using excitation electromagnetic radiation directed at the security element, the security element comprising a number of emitters that are each capable of exhibiting a different emission response to the electromagnetic excitation radiation; the reading comprising determining data indicative of an optical property of the security element using first emission electromagnetic radiation, emitted in response to first excitation electromagnetic radiation; the authenticating further comprising comparing the determined data indicative of an optical property with the unique identifier determined using the method of the first aspect, or using the system of the second aspect.

The method might be undertaken for: excitation different to that previously used, or to be used subsequently; and/or one or more locations on the security element different to those previously used, or to be used subsequently; and/or one or more emitters of the security element different to those previously used, or to be used subsequently.

Authentication might only be allowable if, and is optionally actively prevented unless, the method is undertaken for: excitation different to that previously used, or to be used subsequently; and/or one or more locations on the security element different to those previously used, or to be used subsequently; and/or one or more emitters of the security element different to those previously used, or to be used subsequently.

According to a fourth aspect of the present invention, there is provided a system for authenticating, the system comprising: one or more excitation sources for generating an excitation for use with the security element, the security element comprising a number of emitters that are each capable of exhibiting a different emission response to the excitation; an optical reader, for optically reading the security element by determining data indicative of an optical property of the security element using emission electromagnetic radiation, emitted in response to excitation of the number of emitters; the system being arranged to compare the determined data indicative of an optical property with the unique identifier determined using the method of o the first aspect, or using the system of the second aspect.

In a preferred example, this aspect might be a system for authenticating, the system comprising: one or more electromagnetic radiation sources for generating excitation electromagnetic radiation for directing at the security element, the security element comprising a number of emitters that are each capable of exhibiting a different emission response to the electromagnetic excitation radiation; an optical reader, for optically reading the security element by determining data indicative of an optical property of the security element using emission electromagnetic radiation, emitted in response to the excitation electromagnetic radiation; the system being arranged to compare the determined data indicative of an optical property with the unique identifier determined using the method of the first aspect, or using the system of the second aspect.

According to any aspect: excitation radiation may be generated by a handheld, or wearable, mobile device; and/or emission radiation may be read by a handheld, or wearable, mobile device; and/or excitation radiation may be generated by, and emission radiation read by, a same handheld, or wearable, mobile device.

According to a fifth aspect of the present invention, there is provided security element for use in any preceding claim, comprising: a number of emitters that are each capable of exhibiting a different emission response to excitation in the form of electromagnetic excitation radiation; a reflector for reflecting a portion of the excitation electromagnetic radiation back toward: a source of the excitation electromagnetic radiation; and/or a reader for optically reading the security element.

It will be appreciated that any one or more features described in relation to any one particular aspect of the present invention may be used in place of, or in combination with, any one or more features of another aspect of the present invention, unless such combination or replacement would be understood by the skilled person to be mutually exclusive, based on a reading of this disclosure. In particular, it will be understood that any features described in relation to a method-like aspect of the present invention can be used in combination with any apparatus-like aspect of the present invention, and that any features described in relation to an apparatus-like aspect of the present invention can be used with any method-like aspect of the present invention.

Figure 2:
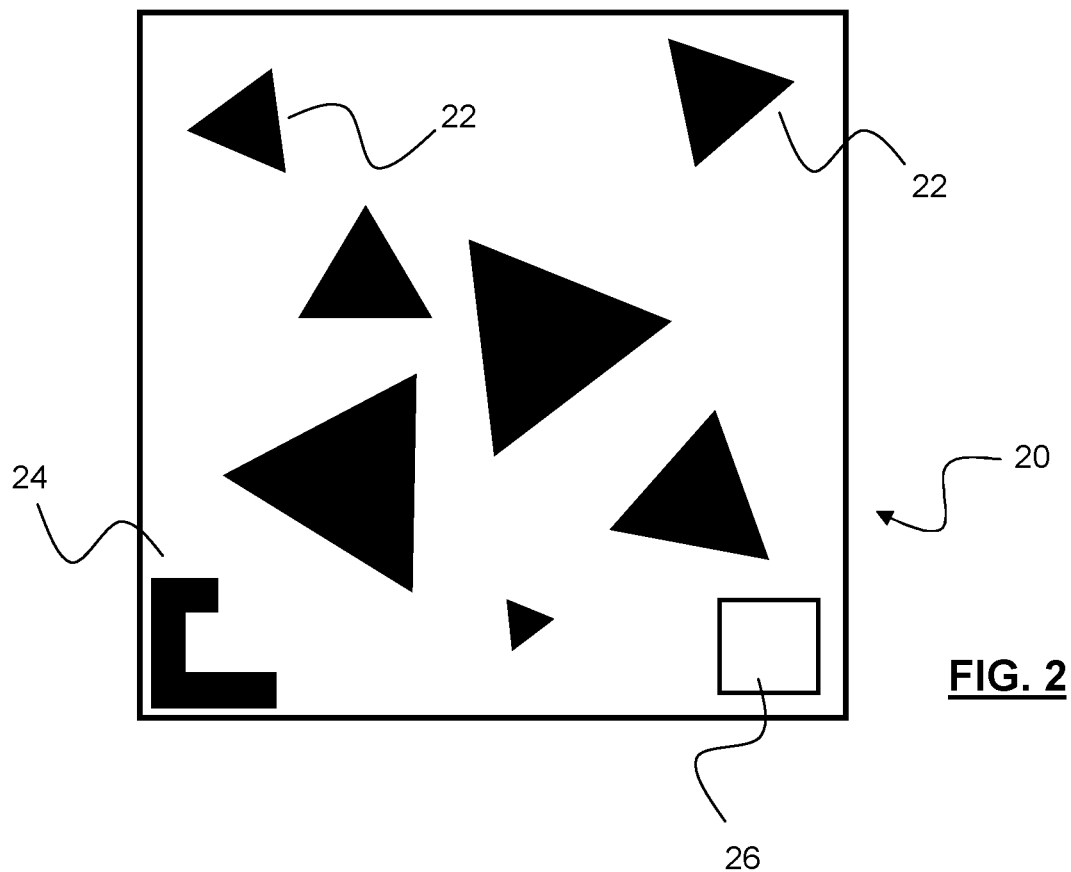
Figure 3:
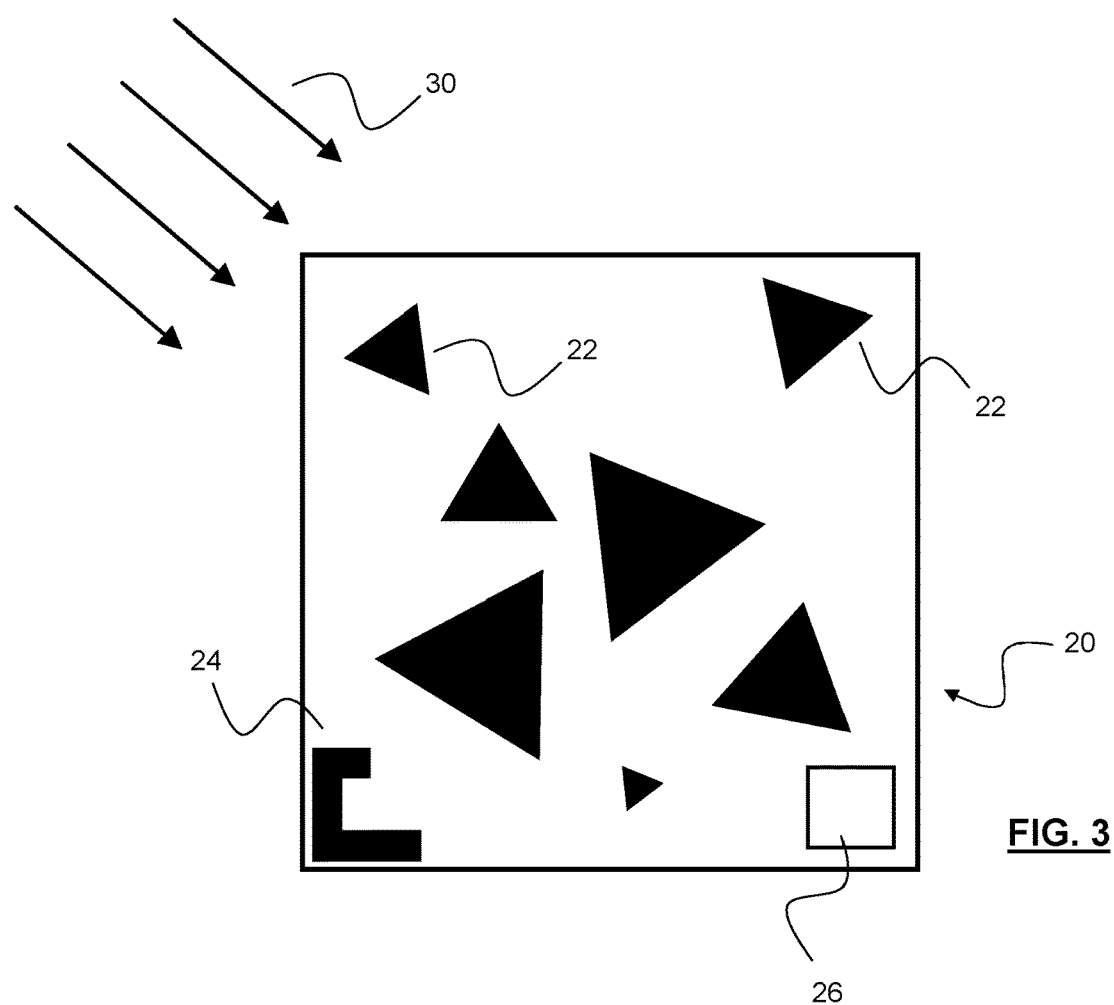
Figure 4:
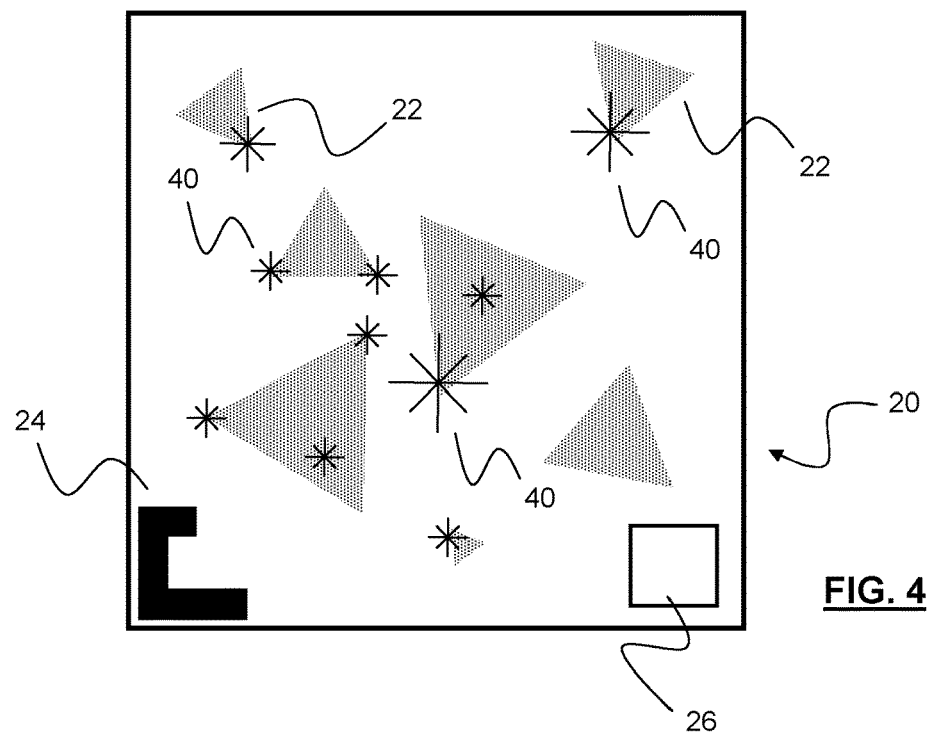
Figure 5:
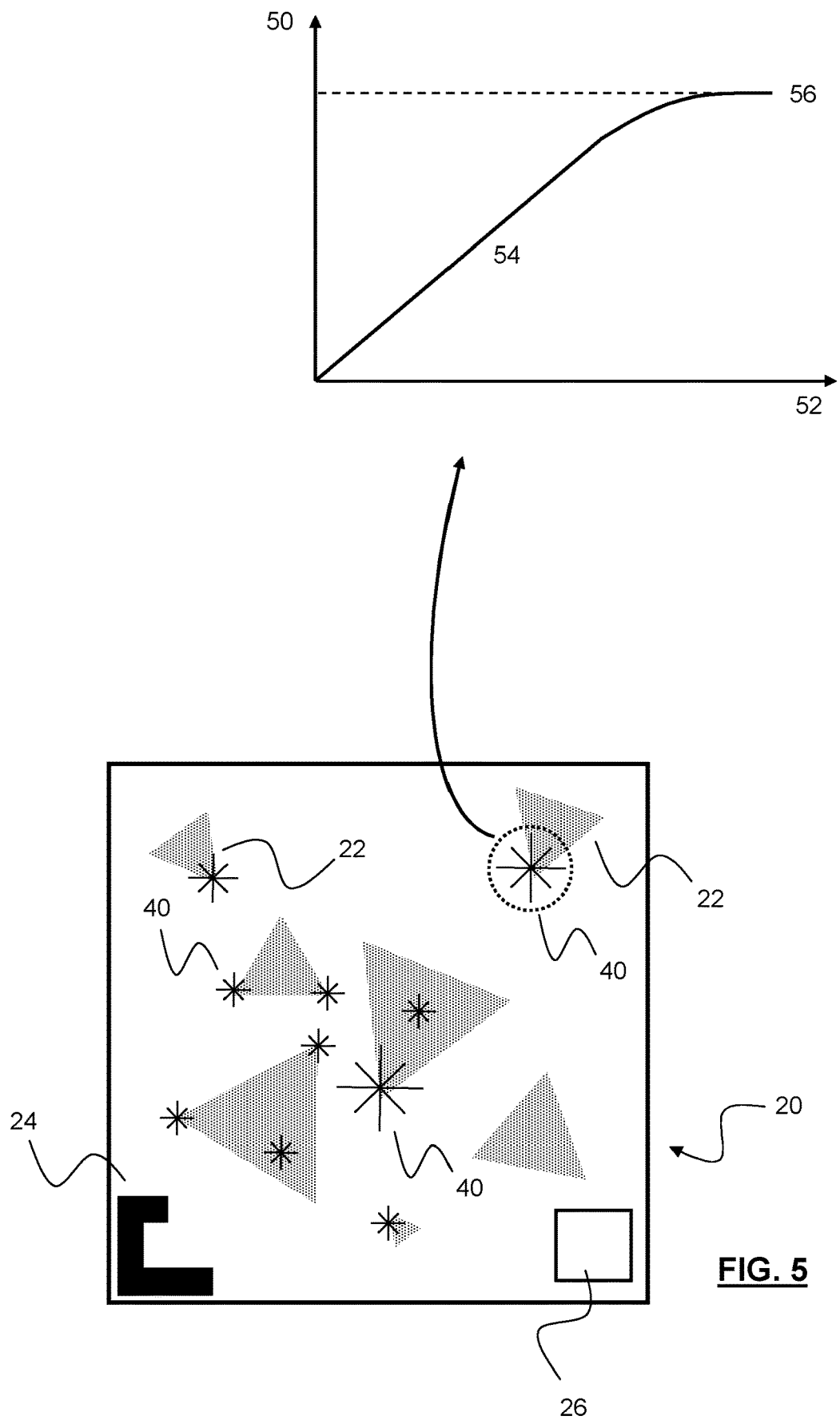
Figure 6:
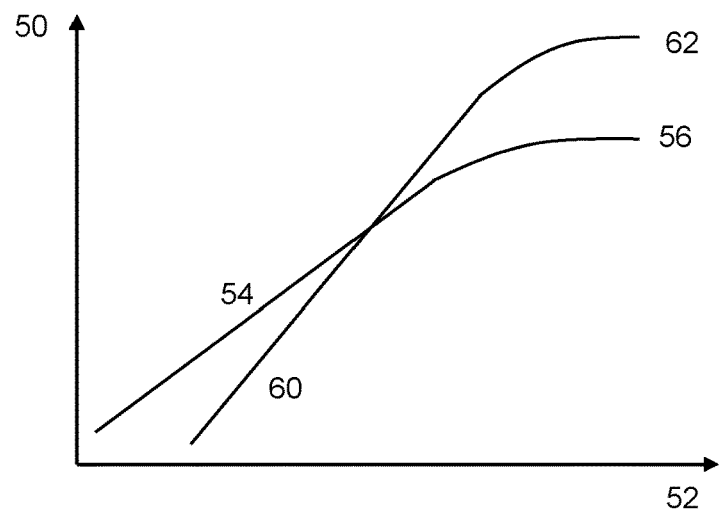
Figure 6:
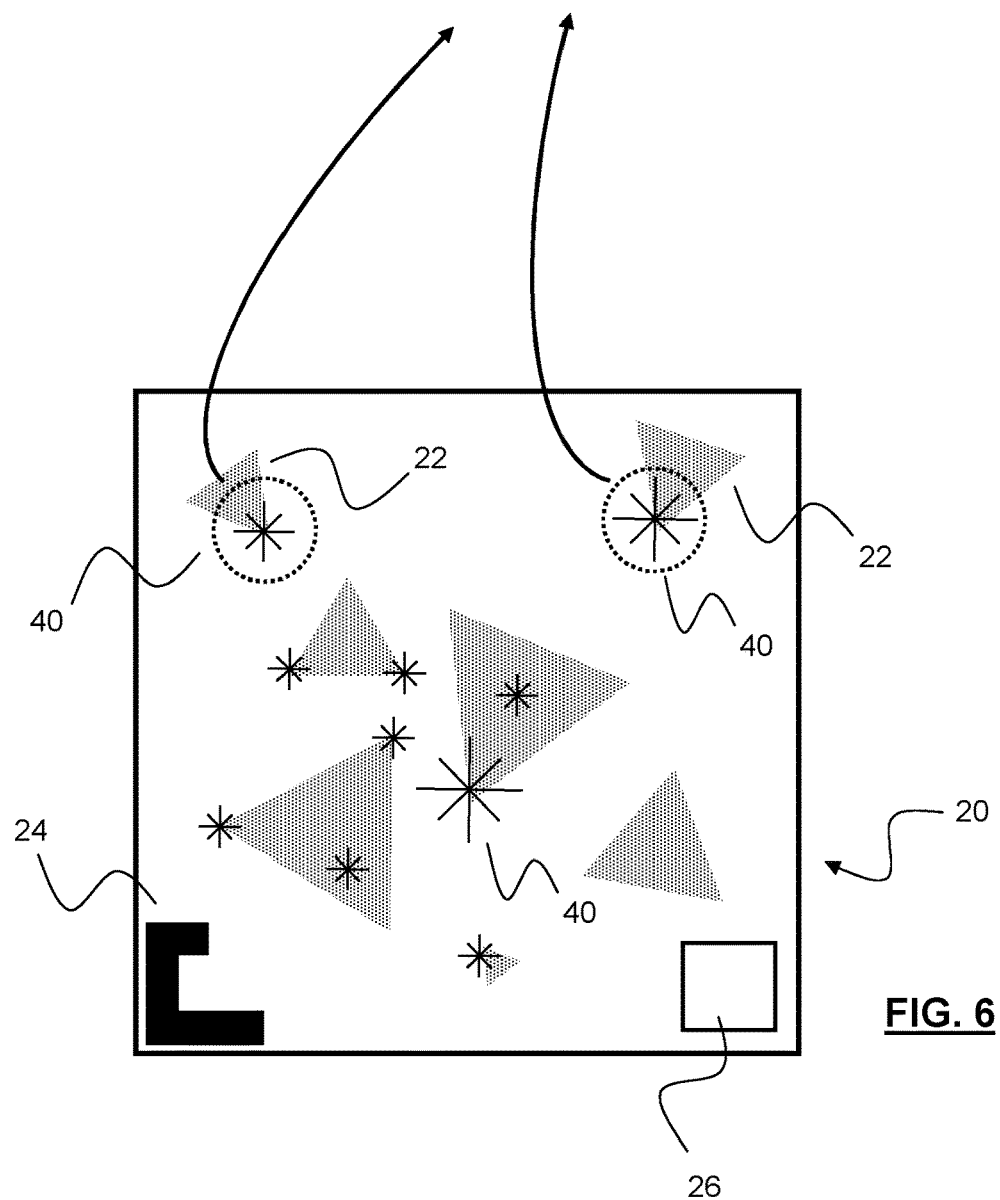
Figure 7:
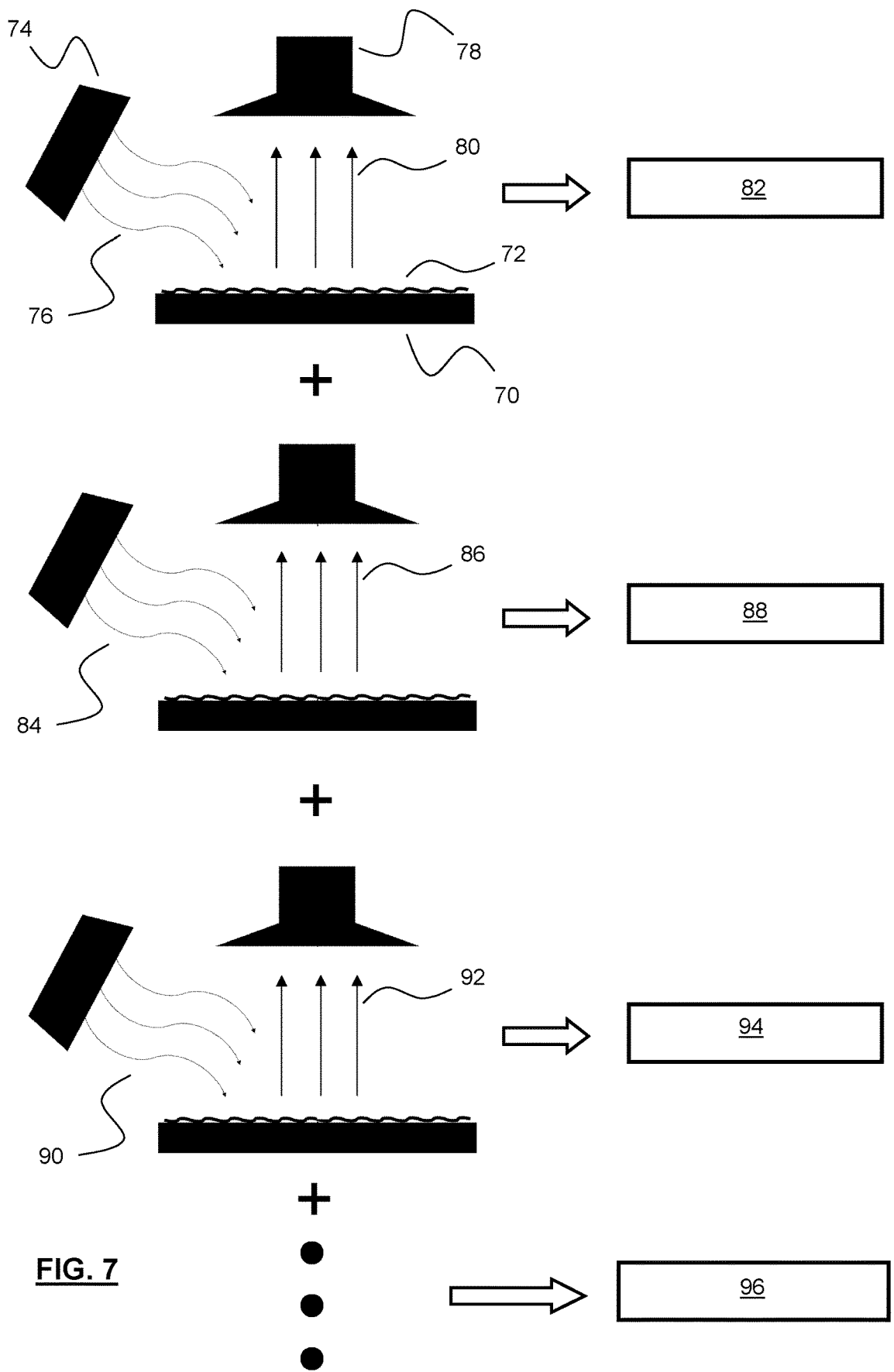
Figure 8:
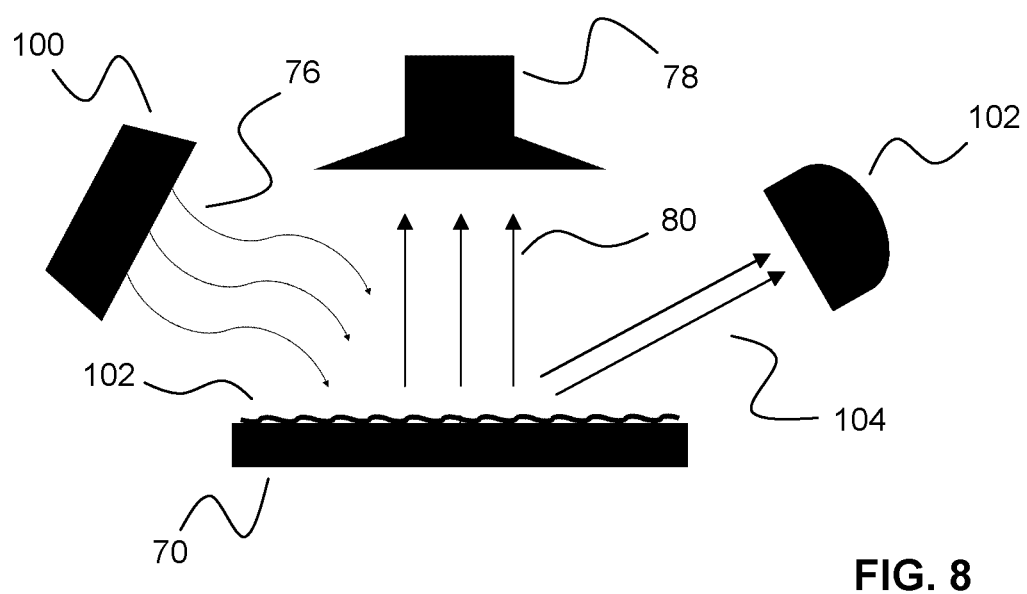
Figure 9:
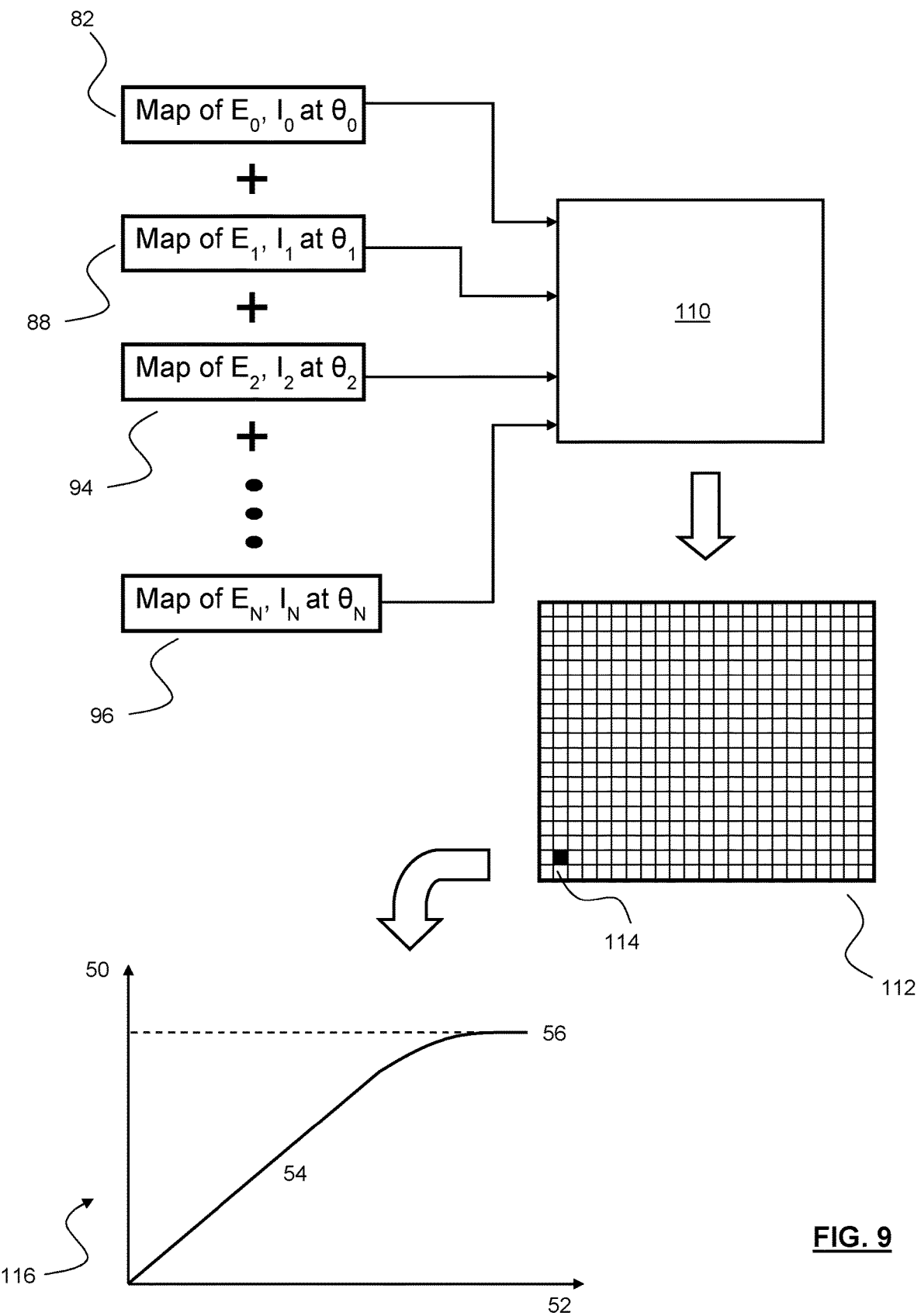
Figure 10:
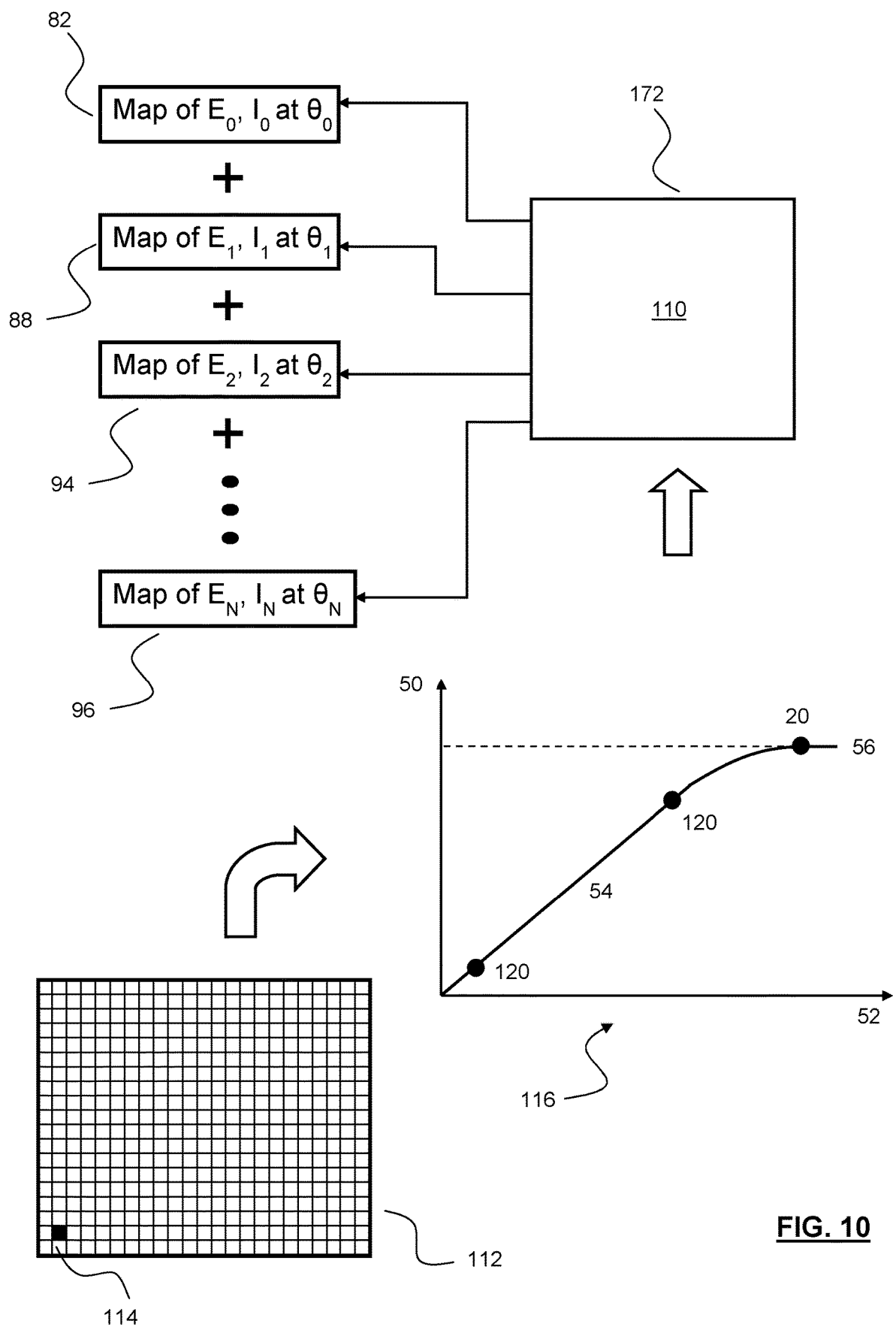
Figure 11:
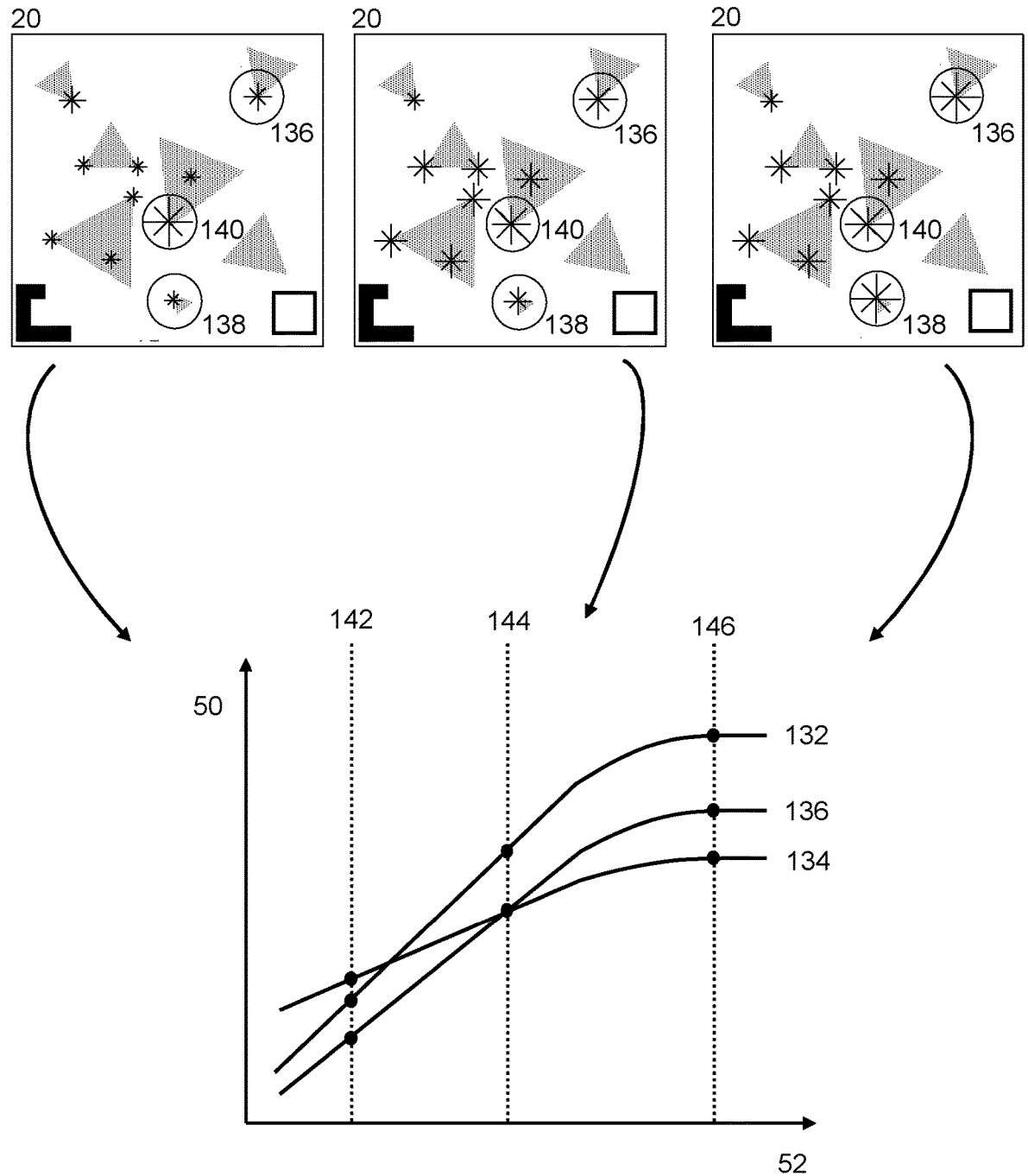
Figure 12:
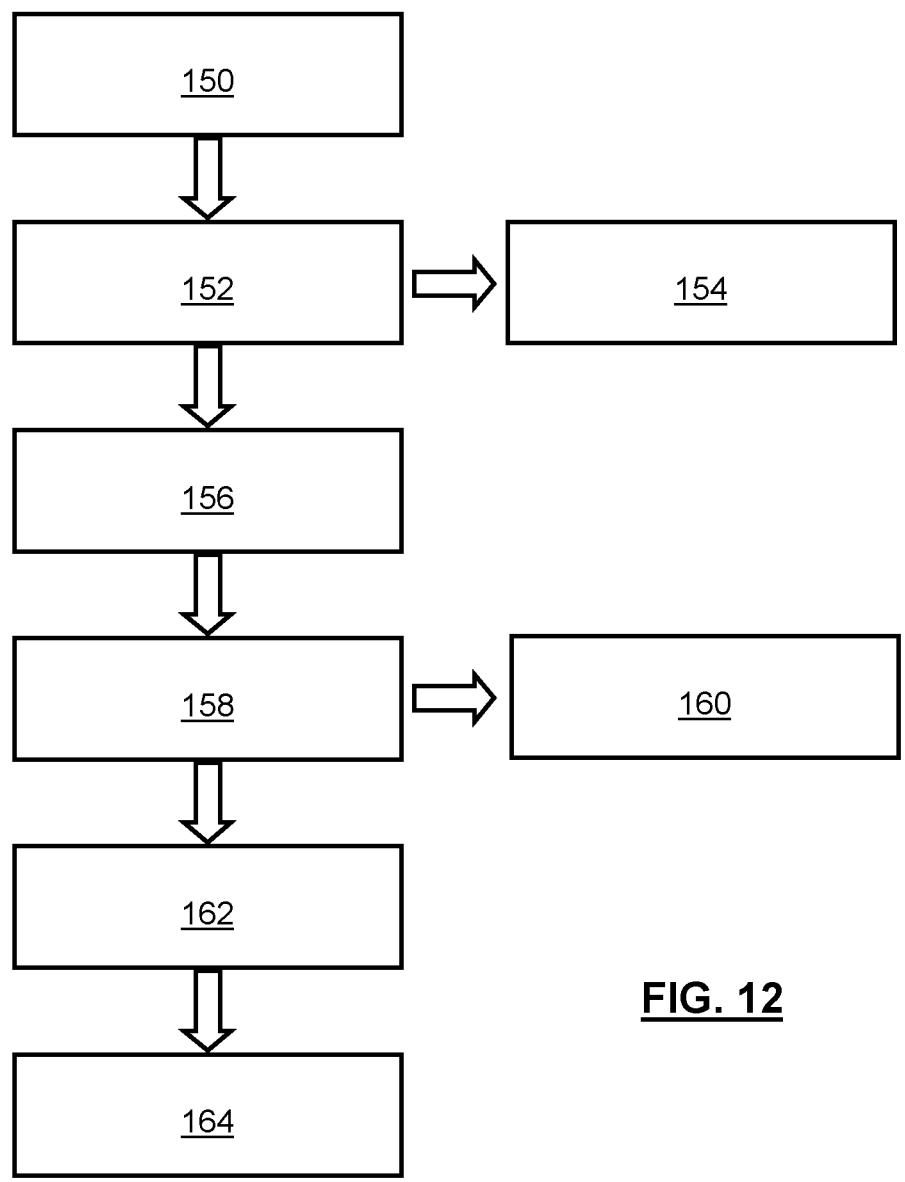
Figure 13:
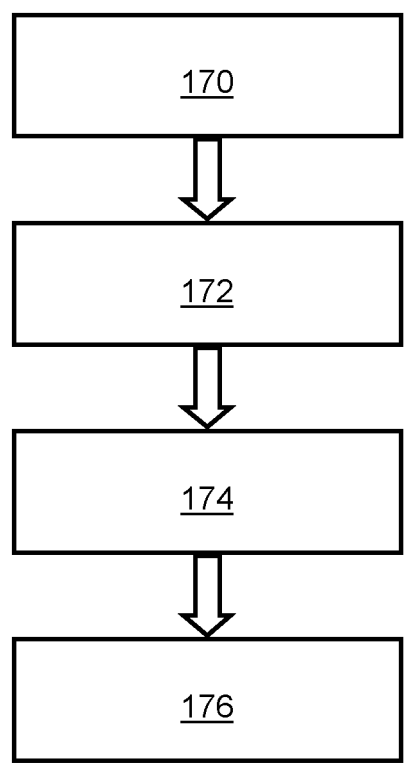
Figure 14:
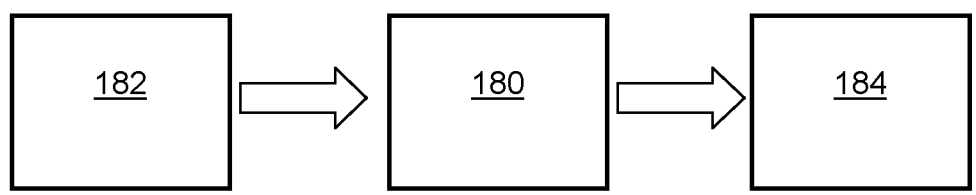
Figure 15:
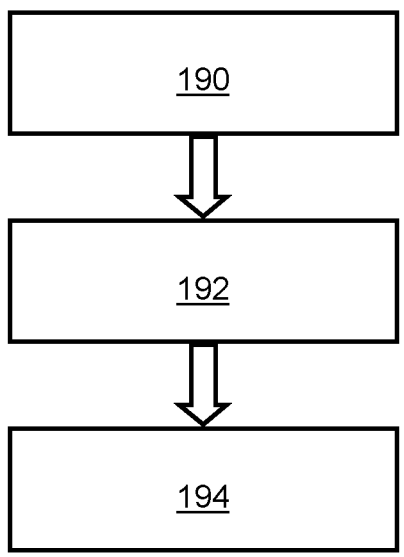
Figure 16:
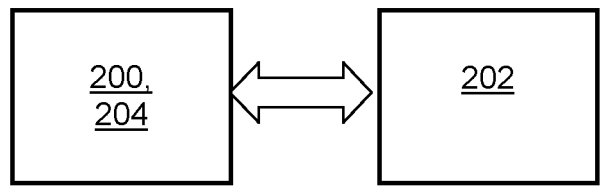
Figure 17:
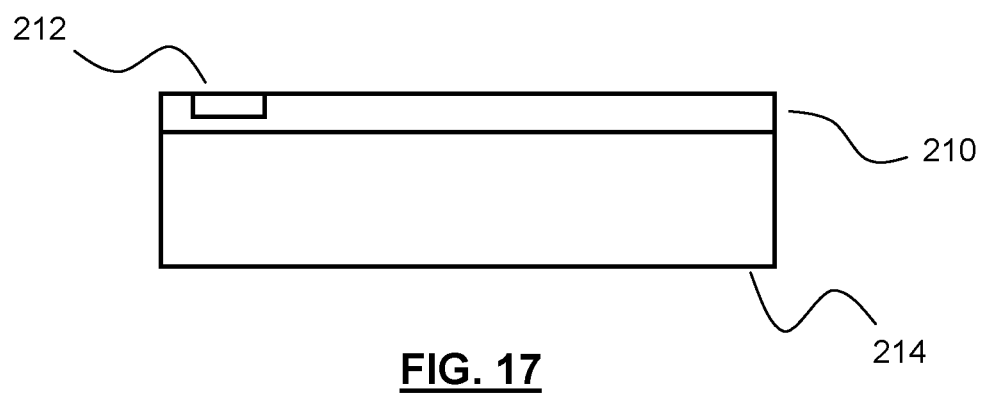

For a better understanding of the invention, and to show how embodiments of the same may be carried into effect, reference will now be made, by way of example, to the accompanying diagrammatic Figures in which:

FIG. 1 schematically depicts the optical reading of a security element according to a proposed system and method;

FIG. 2 schematically depicts optical reading of a security element;

FIG. 3 schematically depicts excitation electromagnetic radiation being direction at the security element of FIG. 2, according to an example embodiment;

FIG. 4 schematically depicts emission electromagnetic radiation being emitted by emitters of the security element of FIG. 1, in response to the excitation electromagnetic radiation of FIG. 2, according to an example embodiment;

FIG. 5 schematically depicts a plot of emission electromagnetic radiation versus excitation electromagnetic radiation for a particular emitter of the security element of FIG. 2, according to an example embodiment;

FIG. 6 schematically depicts plots of emission electromagnetic radiation versus excitation electromagnetic radiation for different emitters of the security element of FIG. 2, according to an example embodiment;

FIG. 7 schematically depicts a system and method for determining a unique identifier for the security element of FIG. 1, according to an example embodiment;

FIG. 8 schematically depicts a system and method for determining a unique identifier for the security element of FIG. 1, according to a different example embodiment;

FIG. 9 schematically depicts the creation of a map of a variation in determined data indicative of an optical property of the security element of FIG. 1 with respect to different excitation (and emission) electromagnetic radiation;

FIG. 10 schematically depicts principles associated with authenticating of a security element using the map of FIG. 9, according to example embodiments;

FIG. 11 schematically depicts more detailed principles associated with authenticating of a security element, according to example embodiments;

FIG. 12 is a flow chart depicting authentication of the security element, according to example embodiments;

FIG. 13 schematically depicts general methodology associated with example embodiments;

FIG. 14 schematically depicts general principles associated with a system according to example embodiments;

FIG. 15 schematically depicts different methodology associated with example embodiments;

FIG. 16 schematically depicts general principles associated with a system according to example embodiments; and FIG. 17 schematically depicts a security element according to an example embodiment.

FIG. 1 schematically depicts a proposed system and method for optically reading a security element. The Figure shows the security element 10. A reader for reading the security element 10 is shown in the form of a mobile device, in this case a mobile telephone 12. It has been proposed that the security element 10 may be optically read via the mobile telephone 12 by appropriate irradiation of the security element 10, for example by way of a flash 14 provided by the mobile telephone 12, and an appropriate detection of emitted electromagnetic radiation from the security element 10. In more detail, the security element 10 can be read by an appropriate sensor and related components of the mobile telephone 12, for example a camera and related components and associated software.

As with all examples described herein, the security element 10 may comprise one or more components arranged to emit electromagnetic radiation when appropriately stimulated. The components may be, for example, quantum dots, quantum wires, flakes or layers of 2D material. The or each component may emit radiation at a single wavelength, or the or each component may emit radiation with different wavelengths, for example corresponding to a variation in band gap of the or each particular component. Each component is therefore an emitter of electromagnetic radiation, or in other words a component configured or generally able to emit electromagnetic radiation when excited, for example by excitation electromagnetic radiation.

The reading of the security element 10 may comprise establishing a two-dimensional (2D) map of how the security element 10 emits radiation across the security element (e.g. across the length and width of the security element). Typically, the one or more components that emit radiation will not be provided within the security element 10 in a controlled, repeatable and consistent manner across different security elements, but will instead be deposited in a random or otherwise deliberately uncontrolled manner. It is this deliberate lack of control which will allow the security element 10 to effectively function as a physically unclonable function, and/or to therefore provide a unique identifier (physically unclonable functions are normally employed in specific ways, and unique identification is perhaps a more general feature, function, or description). That is, the emitters will be distributed across the element in a unique manner.

A read map may be compared in some way with a stored map, to authenticate the security element 10.

The system and methodology shown in FIG. 1 may function satisfactorily. Indeed, it can be very difficult to easily replicate the precise layout of the one or more components that emit electromagnetic radiation, to the extent that it is very difficult to copy the unique identifier provided by the security element. However, it is not impossible, and with advances in technology it may be easier to overcome or circumvent the security that the unique identifier provides, since it may be easier to replicate that unique identifier. Also, the proposed methodology and system in FIG. 1 takes a single reading or snapshot of the emission spectra or spectrum across the security element 10. Since only a single image or snapshot is used to determine the unique identifier, and likely with a commercial end-user device, only a single unique identifier needs to be in some way copied, or replicated or circumvented in order to overcome the security that is provided. This is not just important in the actual reading phase, but also when information for authentication is transmitted to or from a reader, for example in order to authenticate the security element via a database having a previously determined identifier stored therein, for use in the authentication.

It has been realised by the inventors of the present invention that one or more problems associated with the sort of methodology and system as shown in FIG. 1 can be overcome in a relatively simple manner, but which at the same time provides a vastly improved system and method for determining (e.g. initially, or subsequently for authentication) a unique identifier, and a related system and method for authentication using that unique identifier.

In particular, according to the present invention there is provided a method of determining a unique identifier for a security element. The method comprises optically reading the security element using excitation electromagnetic radiation directed at the security element, the security element comprising a number of emitters that are each capable of exhibiting a different emission response to the (e.g. same or different) electromagnetic excitation radiation. The reading comprising determining data indicative of an optical property of the security element using first emission electromagnetic radiation, emitted in response to first excitation electromagnetic radiation, and determining data indicative of an optical property of the security element using second emission electromagnetic radiation, emitted in response to second, different, excitation electromagnetic radiation. The unique identifier is determined from a map of a variation in determined data indicative of an optical property with respect to the excitation electromagnetic radiation. Since the readings, map and unique identifier are based on emission responses that are related to different excitation radiation, the readings, map and unique identifier are richer and more secure. Also, use of different excitation radiation may be relatively easy to implement, for example using a flash of a camera or similar, in comparison with needing specialised equipment that, for instance, an end-under might not need, want or have access to.

FIG. 2 shows a security element according to an example embodiment. The security element 20 comprises a random array or distribution of, in this case, quantum emitters 22. These emitters 22 may be discrete objects, for example colloidal quantum dots, buried solid-state quantum dots, flakes of 2D materials, and so on. They may also be provided in the form one large sheet of material containing defects that act as quantum emitters, e.g. nitrogen vacancies in a 2D sheet of hexagonal boron nitride, etc.

An alignment mark 24 may (optionally) also be included, to allow an optical reader to use that mark 24 to correct for scale, perspective and any transforms (e.g. mirror image) that may have been applied, or which may need to be applied, as part of the reading.

A reflector 26 may also (optionally) be included, to reflect a portion of incident light. That reflected portion may be used in calibrating measurements, readings, and so on.

FIG. 3 shows that the security element 20 is illuminated or irradiated with excitation electromagnetic radiation (with intensity $I_{ex}$) 30 to excite excitons in the quantum emitters 22.

A radiation source that provides the excitation electromagnetic radiation 30 is likely to be broadband, with a significant portion being above a bandgap of the emitters. A single-frequency coherent source, e.g. a laser, could also be used, and could be operated in resonance with the emission energy of the ground state excitons in the quantum emitters 22.

The radiation source could be any convenient electromagnetic radiation source, from a laboratory standard accurately controllable radiation source, all the way through to the flash of a camera of a mobile telephone. That is, specialist equipment is not required.

FIG. 4 shows that photo excited carriers relax and then emit light 40 (emission electromagnetic radiation) via photoluminescence. Zero-dimensional confinement potentials through quantum dots, or defects in 2D materials, will emit more brightly, since the potential increases electron-hole overlap (and therefore the oscillator strength). So, zero-dimensional emitters or emission may be more conveniently and usefully used, in example embodiments.

Zero-dimensional (0D) confinement/emission may be preferred, as above. In particular, such emitters may provide unique saturation points (see below), useful in establishing or determining unique identifiers using the emitters. However, other emitters may be used. In one example, the security element might comprise one or more continuous or discrete components exhibiting quantum mechanical confinement, the or each component being capable of emitting electromagnetic radiation linked to the quantum mechanical confinement. Preferably, the confinement of the one or more continuous or discrete components confines in one or more of 3D, 2D, 1D or 0D. The security element might have a mixture of such components and related confinements. In other words, the one or more components forming the security element might emit radiation at more than one different wavelength or energy, and/or has or have different emission spectra (and/or excitation/emission relationships). For example, components exhibiting 3D quantum mechanical confinement might give a generally flat background emission spectra. 2D confinement might give a broad, sloping background, or perhaps a broad peak. 1D confinement would exhibit narrower peaks in emission energy. 0D confinement would exhibit very sharp and bright peaks in emission spectra. Combinations of one or more degrees of confinement would lead to particularly complex emissions spectra, lending itself to unique identification.

Although not shown, an optical filter may be used to preferentially select certain emission wavelengths or bands, for example emission from the zero-dimensional confined areas, preferentially. Such emission would typically occur at lower wavelengths to emission from bulk. This might make it easier to read such emission. However, use of a filter might not be convenient for an end-user, unless in some way integrated with the reader or the security element (e.g. in some way covering the emitters).

The emission electromagnetic radiation (i.e. the signal) could be measured with any convenient sensor, from a laboratory standard electromagnetic radiation detector, all the way through to a CCD camera of a mobile telephone. That is, specialist equipment is not required.

The emission 40 from a single, or small collection, of zero-dimensional emitters 22 reveals information about the excitonic dynamics in the emitter. In general, the same is true for any emitter that exhibits a varying response to excitation radiation, although this is more true and more pronounced for quantum, and particular 0D, emitters. As shown in FIG. 5, the logarithm of the emission intensity ($I_{em}$) 50 as a function of the logarithm of the excitation intensity ($I_{ex}$) 52 for a particular emitter 40 has a linear gradient 54 at low power/intensity. The constant gradient 54 provides information about the excitonic complexes that are responsible for the emission. For a neutral exciton the gradient is expected to be 1, whereas for a biexciton state the gradient is roughly 2. Charged excitons often have gradients between these values.

For high excitation powers/intensities the emission is expected to saturate 56, since there are more photo-generated excitons than states to fill in the emitters.

The gradient 54 of the linear section of emission is dependent on defects, charge traps and other potentials surrounding the emitter. The gradient 54 is also expected to vary from emitter to emitter. So, gradient 54 is likely to be quite unique in comparison with that of other emitters. That is, each emitter or emission location is likely to have a fairly unique gradient. The point of saturation 56 is limited by the internal and external quantum efficiencies, and number of emitters and the exciton's lifetime. So, saturation point or level 56 is likely to be quite unique in comparison with that of other emitters. That is, each emitter or emission location is likely to have a fairly unique gradient. It is this uniqueness which provides the richness and improved security in the determination and subsequent authentication of a unique identifier.

It is worth pointing out that a logarithmic relationship has been shown, mainly for simplicity and brevity. It is clear that, in general, there will be a relationship between excitation and emission that is unique, and that relationship can be determined or otherwise established in any convenient manner, for example by way of assessment of gradients, fits, and so on. Key is that each emitter or emission location is likely to have a fairly unique excitation-emission relationship. It is this uniqueness which provides the richness and improved security in the determination and subsequent authentication of a unique identifier. A map based on such a relationship is therefore very useful, and very secure. For instance, a security element made to fool or circumvent a check for authenticity might pass a test at a particular excitation and/or emission intensity, but could not fool or circumvent a check for authenticity at different excitation and/or emission intensity without the emitters exhibiting the mapped excitation-emission intensity relationship.

It is also worth pointing out that a relationship between excitation and emission intensities might be very convenient to establish and use. However, other relationships may be used, for example excitation and emission wavelengths or polarisations, and so on. Intensity variation might be far simpler to implement and detect, however.

FIG. 6 demonstrates some of the above principles. Emission from two different locations or emitters 40, will have different gradients 54, 60 and different saturation intensities 56, 62. Measuring a map of the emission from the security element at one (as in FIG. 5), or several (as in FIG. 6) different excitation intensities reveals a complex fingerprint that is unique to the security element. Of course, establishing and using a map of relationship across the element, for more than one emitter or emission location, establishes an even richer, more secure map. A map, or readings related to that map, can be re-measured at any point to validate the authenticity of the security element.

FIG. 7 schematically depicts a more detailed exemplary embodiment of the invention for determining a unique identifier for a security element. FIG. 7 shows that the system comprises a substrate or other object 70 onto or into which a security element 72 such as that described above has been provided. An electromagnetic radiation source 74 is used to irradiate 76 the security element 72 with excitation electromagnetic radiation ($I_{ex1}$). An optical reader 78 is used to optically read or otherwise inspect the security element 72 by receiving and reading emission electromagnetic radiation ($I_{em1}$) 80 emitted from the security element 72 in response to the excitation radiation 76. An initial reading might be undertaken when the optical reading or inspection is undertaken with first excitation radiation 106. From this reading across multiple locations of the security element 72 (e.g. taken in a single step with a 2D sensor or similar) a map 82 (e.g. a spectrum or similar, or simply data relating to the reading) of emission energy or intensity versus excitation energy or intensity at this first excitation intensity 76 is established (a map of $I_{em1}$ at $I_{ex1}$).

Then, the process is repeated when the radiation source 74 is controlled to excite with a second, different, excitation intensity ($I_{ex2}$) 84 to read related emission radiation ($I_{em2}$) 86, in order to establish a second map 88 at this intensity (a map of $I_{em2}$ at $I_{ex2}$). The method may continue at a third excitation intensity ($I_{em3}$) 90 to observe third emission intensity ($I_{em2}$) 92 to establish a third map 94 at that third excitation intensity ($I_{em3}$) 90 (a map of $I_{em2}$ at $I_{ex2}$), and so on 96 (a map of $I_{emN}$ at $I_{exN}$). As discussed below, the maps at each excitation intensity may be combined into an overall map of how the emission intensities vary across the security element 72, and with variation in excitation energies In a laboratory, manufacturing or testing environment, the angle of orientation of the reader 78 with respect to the security element 72 can be controlled in a number of different ways. It might be quite straightforward to fix the orientation of the reader 78 and the security element 72, and to therefore establish a map that is consistent in terms of relative orientation angles. One or more designated features (e.g. an alignment mark) may be used to determine, at least partially optically, the relative orientation between the elements of the system, in order to establish which angle or angles are involved in the reading phase of the method, and/or to correct for that angle when establishing a map.

In a laboratory, manufacturing, or testing environment, there may be a greater degree of control of the components of the system, and/or the associated quality of those components in terms of sensitivities, resolutions, and so on. These may be used to establish a master or high quality map for use in establishing one or more unique identifiers for the security element, for future reference when that same security element is to be used in some form of identification process. The identifier might be the map, or a part thereof, for example the location of one or more peaks, troughs, gradients, fits, curves, saturation points, delays or times to emission from excitation, points of inflection, or so on, at one or more excitation levels, in measured spectra. These could be absolute measured values, or indicative values, for example the 2D location of certain emitters or emission relationships. The unique identifier may depend on the nature and level of security that is required.

FIG. 8 depicts a slightly different methodology to that shown with reference to FIG. 7. In FIG. 7, the radiation source is actively controlled to selectively achieve a required excitation intensity. In FIG. 8, a radiation source 100 may be used which provides different excitation intensities 76 at different times, in a time-varying source of excitation electromagnetic radiation. For example, a single burst excitation source (e.g. a flash) may be used, and the excitation power is measured by an external detector 102 in sync with frames from the reader 78. The measurement might be undertaken via excitation radiation that is reflected 104 from the security element, for example by way of the reflector discussed above. A map across the security element 72, for different excitation and emission intensities, may then be established as discussed above.

The reader 78 would need to be able to measure several frames over the course of the decay of the excitation radiation, and therefore might be a need for a slow decay or a fast reader. A slow decay can be achieved by adding a capacitor to a standard LED flashlamp, for example.

If the time-varying profile of the excitation source 100 is known, then the detector 102 may not be required. This is clearly beneficial, requiring fewer pieces of equipment and so on.

FIG. 9 shows how a number of different maps 82, 88, 94, 96 obtained relative to specific excitation energies (e.g. those shown with reference to FIG. 7 or 8), may be combined into an overall map 110 related to emission intensity (or perhaps other emission properties) versus excitation intensity (or perhaps other excitation properties) at different positions or locations across the security element, and at different excitation intensities (or perhaps other excitation properties) of reading.

The same Figure shows a grid or array 112 which might reflect, be indicative of, or actually equate to an array of pixels in a 2D sensory array—e.g. that used to read the maps 82, 88, 94, 96. This might also be another way of visualising an overall map 110. For a particular pixel, group of pixels, or map point 114, a plot 116 is shown which represents how the emission intensity versus excitation intensity varies at different excitation intensities for that location 114 in the map (and thus location of the security element) 112. This is the same plot 116 as shown in FIG. 5. It will be understood that each location 114 might be associated or otherwise relate to or capture the plot from a single emitter or emission location. However, each location 114 in the map could also be associated or otherwise relate to or capture the plot from more than one single emitter or emission location.

It will be appreciated that the actual measured data could be the unique identifier that is drawn from the map, for example the excitation-emission relationship or spectrum at a particular location and at a particular excitation intensity of the filter system, or similar. Perhaps more generally, the read or determined data might generally be described as being indicative of an optical property of the security element. It may be indicative in that it might be an actual optical property of the security element, for example a particular emission intensity at that excitation intensity or energy or similar. Alternatively or additionally, the data indicative of the optical property might be one or more portions of an emitted electromagnetic spectrum of at least a part of the security element. Alternatively or additionally, the data indicative of an optical property might be a peak, trough, or point of inflection in an electromagnetic emission spectrum or at least a part of the security element. The data could be a gradient, fit, plot, relationship or saturation level, as discussed above. Alternatively or additionally, the data may be even more representative, and for example be or equate to a physical location in relation to the security element of an actual optical property, or a physical location of a peak, trough, saturation intensity, point of inflection or other relationship feature in relation to emission from the security element. The unique identifier could be the number of peaks at a certain excitation intensity, or the number of troughs. Generally, then, the data could be actual data of one or more read features, or representative data, such as a location or count of such features. Features could be read values that do, or do not, exceed a certain value, or which equate to a certain value. That is, the data that is read or obtained or used to provide the unique identifier could be actual absolute measured values, or could be something that is derived from such measured values, for example ratios, or differences, or gradients, or coefficients. Any and all of this can be used to provide a unique identifier, since, as described above, each mapping will be unique to the type and nature of emitters and associated emissions of components forming the security element.

The maps 82, 88, 94, 96, 112 shown in and described with reference to FIG. 9 may be stored in an online database, or some other storage medium, so that the database and the maps within can be later accessed for use when subsequently authenticating the security element, for example when the security element is in use and being used to label or identify or otherwise secure an object which the security element is attached or similar. The maps 82, 88, 94, 96, 112 may be stored in a secure location, so that access to the maps is restricted.

Once a map is established (or at least a portion is established), this map can then subsequently be used to authenticate the security element, during a subsequent reading of the security element. Briefly, if a reading of a security element does not reveal a unique identity derived from an already determined map that is present in the database, or match a particular entry in the database, then the security element might not be deemed as authentic. FIG. 10 shows, simply, how the principles associated with FIG. 9 can be used in reverse. One or points in a relationship of excitation versus emission can be measured for a location on the security element (or more than one location), and compared with previously determined maps 82, 88, 94, 96, 112.

The reading of the security element for authenticating purposes might be much the same as already described above in relation to previous methods and systems. The difference when authenticating is that there will already be a pre-established or determined map to compare newly read data with.

In an end-user environment, however, it might be more difficult to accurately or easily determine or otherwise calibrate the level or power of excitation radiation. FIG. 11 shows that verification without quantitative calibration may be achieved, as alluded to above, by relative comparison of measurements.

In one example, maps or relationships are measured 130, 132, 134 for different locations 136, 138, 140 at several different excitation powers 142, 144, 146. The unique pattern in the map or relationship (or a subset of it) from one of these powers is used to identify which security element in the database is being measured. This pattern may be enough to be satisfactory, but may not always work in the absence of known excitation powers because a numerical link between excitation and emission is not known. That is, this approach could find false fits, if stored relative relationships come close to matching those read.

As a next step, or as a different approach, a ratio of emission intensities for a series of fixed points between different excitation powers 142, 144, 146 is compared. A fitting routine checks to see if the stored data could or does reproduce these ratios. If so then the tag is measured tag is valid, and not a clone. There is no need for excitation power readings or knowledge.

In other words, a quantitative relationship between excitation and emission powers is not known (or trusted). An intensity of emission in each frame/reading is normalised, so that the most intense pixel in each frame/reading is the same. Key elements in one frame/reading, or the average of several frames/reading, is used to identify if the security element, or a selection of possible candidates, lie in a database or stored maps or data. If a security element is not identified, then the measurement fails authentication.

If the previous step is passed then for each frame/reading, with different excitation powers, it is verified that there is an excitation power in the stored data at which the ratio of intensities between key points in the frame/reading matches the one measured. If this test is passed, then the security element is successfully authenticated.

When it comes to authenticating a security element, a request or related information from a database (or controlling software) might be sent to a consumer or end-user, or their reader, for undertaking the authentication. This might, of course, be largely transparent to the user. The user might simply be asked to point the camera of the mobile device at a security element and take one or more photos, videos, or similar. The user might simply be asked to point the camera of the mobile device, and the or any reading at the excitation intensity (e.g. a decaying flash) of reading then compared with the mapping in the database. That is, the user might not actually be asked to use a particular excitation intensity. Instead, this might be left to chance or choice of the user. The user might not be aware of the mechanisms underpinning the authentication described herein. In fact, no actual photos or videos might be taken—the data from the sensor may simply be used without necessarily being permanently stored.

In a related example, data from a database representing entries in the map might not need to be sent to the reader of the end-user or consumer. Instead, when authentication is required, the reader of the end-user or consumer might be internally or externally prompted to simply undertake the above methodology for determining optical properties of the security element at a range of excitation intensities, or at a particular intensity. Once this has been undertaken as described above, this data could then be anonymised and sent back to the database or controlling software for comparison with entries within that database. If these entries match, the database might simply provide identifying location signal or message back to the user or consumer.

In a related example, the database might send a unique identifier from a stored map, and this is simply looked for at the reader end. For example, the database might send data indicating that X peaks are expected at intensity A, Y ratios are expected at intensity B, and Z saturations are expected are expected at intensity C, and so on. If one reading matches one of these identifiers, the element may be deemed authentic. Alternatively or additionally, something like a hash function could also be used to abbreviate and/or anonymise the (more complex) map The mapping across different configurations might allow for tiered or more robust security. For example, the unique identifier might be based on features across or within a map at a given intensity, and/or across or between intensities. In a crude and random example, the unique identifier might be based on there being a peak A at location B and intensity C, and there being D peaks at intensity E, and there being a change in number of peaks (e.g. due to saturation or other reasons) from F to G with a change in intensity from H to I. Again, the power is in the mapping being across different intensities (or more generally different excitation properties), to give a very rich map for possible unique identifier determination.

FIG. 12 schematically depicts methodology for authenticating a unique identifier associated with the security element.

Initially, intensity relationship maps are established as discussed above 150.

Next, key locations (e.g. brightest) in a frame/reading, or across frames/reading, might be sent to a server to verify that the security element is in the database, 152. Output data may be anonymised into, for example, a 1D key with an appropriate algorithm (for example a hash function or similar). This data may then be corrected for environmental noise and other factors, for example using a fuzzy extractor or similar. In fact, any transmitted data, to/from the reader, may be in some way anonymised.

If the security element is not found then an error message may be returned, or a prompt for a retest, or the element or data marked as non-genuine 154. The non-genuine element data could be stored, for use in proof of counterfeiting of the element or an object used in conjunction with the element.

If the element is located in the database, data relating to a ratio of intensities between key points in each frame/reading can then be requested by the authentication system and then sent by the user's reader 156.

Next, the stored maps are read or accessed to verify each that the or each ratio is present in the stored data 158.

If the ratios are not found then an error message may be returned, or a prompt for a retest, or the element or data marked as non-genuine 160. Again, the non-genuine element data could be stored, for use in proof of counterfeiting of the element or an object used in conjunction with the element.

If all ratios are found in the stored maps/data, then the security element is authenticated 162.

The user may then be informed that the element is authentic 164.

The requested and read data may be put into an algorithm (e.g. hash function) to anonymise and/or minimise data transfer, to create a 1D key. Extracted 1D keys may then be compared to one another, and if they agree then the security element is verified as being authentic.

Error margins may vary depending on the security requirements, for example with perhaps larger error margins being allowed for less robust security requirements, and being tighter for more secure environments. Hash functions generally do not allow for margins of error—if input data is changed even slightly then the output should be randomly different. Error correction therefore likely has to be done prior to hashing, by some form of smoothing, or approximating of the data. Another possibility is sending information about features/sections of the security element (e.g. the map data or unique identifier data) hashed separately, and authenticating based on partial success, e.g. one of the hashes passing a comparison test or similar.

FIG. 13 depicts perhaps more general, preferred methodology for determining an identifier for a security element.

The method comprises optically reading the security element using excitation electromagnetic radiation directed at the security element 170. The security element comprises a number of emitters that are each capable of exhibiting a different emission response to the (same or different) electromagnetic excitation radiation.

The reading comprises determining data indicative of an optical property of the security element using first emission electromagnetic radiation, emitted in response to first excitation electromagnetic radiation 172.

The reading comprises determining data indicative of an optical property of the security element using second emission electromagnetic radiation, emitted in response to second, different, excitation electromagnetic radiation 174.

The unique identifier is determined from a map of a variation in determined data indicative of an optical property with respect to the excitation electromagnetic radiation 176.

In practical likelihood, the reading will be undertaken for multiple locations across the security element at the or each configuration of the filter system, such that the map is a map of the variation in determined data indicative of the optical property across the security element with respect to the configuration of the filter system.

In all practical likelihood, the reading for multiple locations of the security element is likely to be undertaken in a single reading step, using a reader with a 2D sensor.

FIG. 14 depicts a general, preferred system for determining the unique identifier for a security element 180.

The system comprises one or more electromagnetic radiation sources 182 for generating first excitation electromagnetic radiation and second, different excitation radiation, for directing at the security element 180, the security element 180 comprising a number of emitters that are each capable of exhibiting a different emission response to the (same or different) electromagnetic excitation radiation.

An optical reader 184 is provided, for optically reading the security element 180 by determining data indicative of an optical property of the security element 180 using first emission electromagnetic radiation, emitted in response to first excitation electromagnetic radiation, and by determining data indicative of an optical property of the security element using second emission electromagnetic radiation, emitted in response to second, different, excitation electromagnetic radiation.

The unique identifier is determined from a map of a variation in determined data indicative of an optical property with respect to the excitation electromagnetic radiation. The map could be stored locally, within or as part of the system, or remotely, for example not forming part of (at least) the reader 184 to improve security.

A number of emitters could be one or more. One emitter might work as discussed above, since it will still have a relationship between excitation and emission that can be used to establish a unique identifier. More than one emitter makes the unique identifier potentially far richer and more secure, since the location, and nature of emission make the identifier far more complex.

Although, strictly speaking, not essential, in practice the reader 184 is highly likely to be arranged to undertake readings from multiple locations across the security element 180 at the or each excitation intensity of the filter system source 182, such that the map is a map of the variation in determined data indicative of an optical property across the security element 180 with respect to the intensity of the excitation radiation from source 182.

Again, although not essential, in practice it is highly likely that the reader 184 will comprise a 2D sensor for reading multiple locations across the security element 180 in a single reading step.

In other words, in another embodiment it may not be necessary to read across multiple locations, and/or undertake such readings in a single step. For example, reading at one or more discrete locations might be satisfactory, for example at one or more particular locations of the security element. The readings could be undertaken at one or more, but not all, locations at a time. A one dimensional sensor may be satisfactory, for example reading across or along a line (e.g. row or column or diagonal) of locations of the security element, as opposed to across the element in two dimensions. A sensor that can only read a single location may also be satisfactory, even if used on multiple occasions to take readings across the element. A two-dimensional sensor may simply be more effective and efficient for taking multiple readings across the element, and is the sort of sensor typically found in mobile devices as described herein. That is, specialist equipment is not required.

FIG. 15 schematically depicts a general, preferred method of authenticating. The method comprises optically reading a security element using excitation electromagnetic radiation directed at the security element 190. The security element comprises a number of emitters that are each capable of exhibiting a different emission response to the electromagnetic excitation radiation.

The reading comprises determining data indicative of an optical property of the security element using first emission electromagnetic radiation, emitted in response to first excitation electromagnetic radiation 192.

The authenticating further comprises comparing the determined data indicative of an optical property with the unique identifier determined using the method or system as described above in relation to FIGS. 13 and 14, to authenticate or otherwise the security element that has been read.

It is important to note that the authenticating might not require reading at different excitation intensities. A single reading might be sufficient, when compared with the map that was established using different excitation intensities. With only a single reading, the approach might perhaps be less secure. This problem can be avoided by one or more, or a combination of: using excitation electromagnetic radiation different to that previously used, or to be used subsequently; and/or using/reading one or more locations on the security element different to those previously used, or to be used subsequently; and/or using/reading one or more emitters of the security element different to those previously used, or to be used subsequently. This is to the extent that authentication may only be allowable if, and is optionally actively prevented unless, the method is undertaken for: excitation electromagnetic radiation different to that previously used, or to be used subsequently; and/or one or more locations on the security element different to those previously used, or to be used subsequently; and/or one or more emitters of the security element different to those previously used, or to be used subsequently. Such control can be undertaken locally, at the reader, and/or remotely, at the location of map data storage.

Related to the method of FIG. 15 is a general, preferred authentication or authenticating system, as shown in FIG. 16.

The system comprises one or more electromagnetic radiation sources 200 for generating excitation electromagnetic radiation for directing at a security element 202, the security element 202 comprising a number of emitters that are each capable of exhibiting a different emission response to the (same or different) electromagnetic excitation radiation.

An optical reader 204 is provided, optionally and conveniently in the same package/device as the source 200. The reader 204 is for optically reading the security element by determining data indicative of an optical property of the security element using emission electromagnetic radiation, emitted in response to the excitation electromagnetic radiation;

The system is being arranged to compare the determined data indicative of an optical property with the unique identifier determined using the method or system as described above in relation to FIGS. 13 and 14, to authenticate or otherwise the security element that has been read.

Again, although not essential, in practice it is highly likely that the reader 204 will comprise a 2D sensor for reading multiple locations across the security element 202 in a single reading step.

In a practical implementation, at least for an end-user, it is convenient for excitation radiation to be generated by a handheld, or wearable, mobile device; and/or emission radiation to be read by a handheld, or wearable, mobile device; and/or excitation radiation to be generated by, and emission radiation read by, the same handheld, or wearable, mobile device.

FIG. 17 schematically depicts a preferred security element for use in accordance with the methods and systems described above. The security element comprises a first part 210 suitable for emitting electromagnetic radiation, as described above. For instance, the first part 210 may comprise one or more continuous or discrete components, particularly in the form of one or more continuous or discrete components capable of emitting electromagnetic radiation as a result of, or associated with, quantum mechanical confinement exhibited by those one or more components.

The security element also comprises a second part 212, in the form of an optical reflector. The reflector may be helpful in calibrating the overall system in terms of gaining knowledge, or more accurate knowledge, of the excitation intensity. The reflector 212 reflects a known proportion of the incident radiation (e.g. at a particular angle and distance from the reader/element) for calibration purposes. The calibration functionality can be achieved by characterising the reflection as a function of position. It could also be done through design and simulation—e.g. making the reflector out of an array of cube-corners in the surface of the element (or next to it) and then using ray tracing or similar to understand the proportion of rays from a light source in an arbitrary position that would be reflected back into the numerical aperture of the reader.

The first part 210 may be attached to or form part of an object 214. The object 214 might be part of the security element, for example a substrate or support for the first part 210, or might be a separate object, to which the security element is attached for use in authentication.

The system described above is something of a deliberate excitation system, where a dedicated excitation source has been used to obtain the required measurements. It might be possible to implement the above methodology using ambient lighting or similar. Such an approach, though, might not have the flexibility of the deliberate, dedicated and controlled variation in excitation as described above.

It is also worth noting that the excitation described so far has been described in optical terms. This is highly convenient, in terms of end-user functionality at least. This is why the general examples of FIGS. 13-16, and optionally 17, have been described as preferred. However, the excitation could be undertaken by some other approach, for example electrically. That is, the emitters could be electrically excited, by way of being or forming light emitting structures, such as light emitting diodes, that can be electrically excited to emit radiation. Different emissions properties could be obtained by different electrical excitation, in the form of intensity, power, energy, voltage, or current of the electrical excitation. At a basic level, there simply needs to be a relationship between excitation of the emitters, and resulting emission from those emitters, the emitter each capable of exhibiting a different emission response to the electromagnetic excitation radiation. That is, optically reading the security element might comprises using excitation of the emitters that are each capable of exhibiting a different emission response to the excitation. So, causing the security element to emit electromagnetic radiation, to facilitate the optical reading of the security element, might be undertaken by one or more of: irradiating the security element with electromagnetic radiation; and/or irradiating the security element with electromagnetic radiation such that emission occurs by non-resonant photoluminescence; and/or irradiating the security element with electromagnetic radiation, wherein an irradiation wavelength is different from an emission wavelength of the security element (to improve selectivity, although a filter could solve this problem, and also problems with background light levels); electrically exciting the security element. Optical excitation is simply easier to implement by, in particular, and end-user, for example using a camera flash.

In terms of electrical excitation, emitters in the form of 2D material flakes, or quantum dots in a heterostructure, could be surrounded by a tunnel barrier (e.g. comprising one or more layers of boron nitride) with a conductive layer on the top and bottom (e.g. graphene), so as to form a light emitting diode. Varying the voltage applied between the two conductive layers (e.g. of grapheme) would then change the current driven through the diode and with it the emission excitation strength. This method of implementation might not generally be preferred, since it is perhaps more complex and difficult to implement when making the security elements themselves, and/or having to use surrounding driving circuitry or similar. However, and in contrast, it is easier to make a high fidelity measurement of the security element using electrical excitation, since you do not need to worry about or take into account rejecting/otherwise filtering the radiation used for excitation, and/or any calibration with respect to potentially unknown excitation radiation intensities.

The extraction of information from an optical emitter as described herein might intentionally or inadvertently verify that it is complex at the atomic scale, and (e.g.) zero-dimensional. This prevents a simulation attack, where by a passive representation of the security element (e.g. a photocopy) could be passed off as being genuine. Such passive representation will fail authentication as the complex dynamics and relationships that are measured can only be reproduced by a complex, for example, quantum system.

Alignment marks have been described throughout. These are not strictly required; angles and distances between features in the security element or surrounding objects could be used to correct for perspective and zoom, but an alignment mark makes this easier and faster.

A 'unique' identity, e.g. serial number, could be printed below each security element to make identifying the correct record in the server to verify against very fast. Some applications may require this, others may not want it. The actual authentication will, of course, be then based on the relationships described above.

Similarly, if a first stage of verification (e.g. finding one or more candidate record in the database) is used (e.g. via basic checks on serial number or initial optical readings) then, depending on resolution, measurement quality and the number of key points chosen, more than one candidate may be selected. The actual authentication will, of course, be then based on the relationships described above.

As briefly discussed above, if the excitation source contains radiation at the emission wavelength of the emitters in the element then a portion of the signal measured during verification will be reflected radiation, and not just emitted radiation. This background can be removed, or excluded, during verification. For example, the presence of extra emitters, or some emitters not displaying the correct/expected behaviour may not return a failure if sufficient other emitters do display the correct/expected behaviour. A colour or polarisation filter would help to reduce the measurement of background/unwanted signals, but this may increase cost and complexity. The preferred embodiment would not require a filter.

As briefly discussed above, in a factory, or point of first characterisation, a camera used as the reader may record a higher (or lower) resolution image, or many more frames (or fewer) at different excitation powers than when verified later (in the field, by a user). The signal from several pixels may be compared to produce the same response as a lower resolution detection would have, to allow the verification stage to complete successfully.

Again as discussed above, the database (and verification communications) may just involve important parameters, rather than complete emission-excitation plots. These may include, but are not limited to, the linear gradient at low power on the log-log plot (i.e. the polynomial degree), the threshold of saturation and the relative saturation intensity.

Some quantum emitters exhibit the phenomenon of 'blinking', where long-lived dark exciton states form resulting in emission switching off for a period of time. This probability of being on could also be used as a check of validity, as it is a unique factor that is difficult to reproduce. That is, a delay in emission could be part of the unique identification.

Authentication, or the related processing, might require certain things to be in place, for example a minimum number of key points (locations/emitters) may be required, a minimum resolution or image quality may be required, and a minimum number of different excitation intensities may be required. If any of these conditions are not met then the user may be prompted to re-measure the security element. These prompts could include asking the user to move closer to, or further away from the element, to move to a location with better lighting conditions (e.g. indoors to reduce background), or to hold the reader more steadily.

The security element described herein does not necessarily need to be shown, marked or advertised as such. The element could be discretely located on, alongside, on or within an object for which authentication is required. The element could be applied when the object is made, or retrospectively.

The security element described herein generally functions as an optically readable physical unclonable function.

Determining of a unique identifier, or other information, might comprises defining, obtaining, checking, confirming, or so on, that unique identifier, or other information.

The invention is subtle but powerful in taking advantage of the excitation-emission profile of one or more emitters— that is, the emission of an emitter (or emitters) at one excitation, and the emission of the same emitter (or emitters) at a second excitation, all as described above. So, intrinsic properties of the same emitter or emitters are used in the methodology or apparatus discussed herein. This is in contrast with, for example, an approach where excitation from different angles is used, for example a first angle and, next, a second angle. Such an approach might take advantage of, or use, different relative positions of emitters embedded in a body (e.g. different reflections or scattering responses), but does not take into account the key, intrinsic excitation-emission profile of a given (same) emitter at different excitations, as is the case with the present invention. So, the invention is more subtle, yet is almost impossible to copy— the intrinsic excitation-emission profile of a given (same) emitter (or emitters) would need to be copied, in addition to the physical location of the emitter(s). Also, the invention may be implemented without needing to change a reading angle and/or position of the reader/element, since the invention does not rely on such angular or positional dependence. This makes the invention simpler to use, and arguably simpler to process, since no positional/angular measurements need to be taken, identified, or generally taken into account. This might also mean that fewer radiation sources are required.

Although a few preferred embodiments have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of determining a unique identifier for a security element, the method comprising:
    optically reading the security element, the security element comprising a number of emitters that are each capable of exhibiting a different emission response to an excitation of the number of emitters;
    the reading comprising determining data indicative of an optical property of the security element using first a emission electromagnetic radiation, emitted in response to first excitation of the number of emitters, and determining data indicative of an optical property of the security element using a second emission electromagnetic radiation, emitted in response to second, different, excitation of the number of emitters, wherein the unique identifier is determined from a map of a variation in determined data indicative of an optical property with respect to the excitation of the number of emitters; and
    verifying that the number of emitters is a quantum system and complex at the atomic scale, based on the variation in determined data.

2. The method of claim 1, wherein the method is undertaken, and the map established, for at least one of different locations on the security element, or for different emitters of the security element.

3. The method of claim 1, wherein the first excitation and the second excitation radiation are undertaken electrically, and optionally have one or more of a different: intensity, power, energy, voltage, or current.

4. The method of claim 1, wherein the first excitation and the second excitation comprise excitation electromagnetic radiation directed at the security element, and wherein the first excitation and the second excitation:
    have a different intensity;
    comprise substantially the same wavelength or wavelengths, frequency or frequencies, energy or energies, polarisation or polarisations; and
    have a different intensity and originate from the same electromagnetic radiation source, configurable to emit at different intensities.

5. The method of claim 4, wherein the first and second excitation electromagnetic radiation originate from:
    one or more radiation sources, controllable to actively select an intensity of the excitation electromagnetic radiation; or
    different times in a time-varying source of excitation electromagnetic radiation.

6. The method of claim 1, wherein the data indicative of an optical property of the security element comprises one or more of:
    an actual optical property;
    an electromagnetic emission spectrum of at least a part of the security element;
    a peak, trough, gradient, saturation point, or point of inflection in an electromagnetic emission spectrum of at least a part of the security element;
    a physical location in relation to the security element of an actual optical property;
    a physical location of a peak, trough, gradient, saturation point, or point of inflection in an electromagnetic emission spectrum of the security element in relation to the security element; or
    a delay in radiation being emitted.

7. The method of claim 1, wherein the security element comprises one or more continuous or discrete components exhibiting quantum mechanical confinement, the or each component being capable of emitting electromagnetic radiation linked to that quantum mechanical confinement, in response to the excitation, wherein the confinement of the one or more continuous or discrete components optionally confines in one or more of 3D, 2D, or 1D, or 0D.

8. The method of claim 1, wherein the reading is undertaken for multiple locations across the security element at the or each excitation, such that the map is a map of the variation in determined data indicative of an optical property across the security element with respect to the excitation, and optionally wherein the reading for multiple locations across the security element is undertaken in a single reading step, using a reader with a two-dimensional sensor.

9. The method of claim 1, wherein:
    the excitation is in the form of excitation electromagnetic radiation generated by a handheld, or wearable, mobile device; and/or
    the emission radiation is read by a handheld, or wearable, mobile device; and
    the excitation electromagnetic radiation is generated by, and emission radiation read by, a same handheld, or wearable, mobile device.

10. The method of claim 1, wherein the security element includes:
    a number of emitters that are each capable of exhibiting a different emission response to excitation in the form of electromagnetic excitation radiation; and
    a reflector for reflecting a portion of the excitation electromagnetic radiation back toward: a source of the excitation electromagnetic radiation; and/or a reader for optically reading the security element.

11. A system for determining a unique identifier for a security element, the system comprising:
    one or more excitation sources for generating a first excitation and a second, different excitation, for use with the security element the security element comprising a number of emitters that are each capable of exhibiting a different emission response to the excitation of the number of emitters; and
    an optical reader, for optically reading the security element by determining data indicative of an optical property of the security element using a first emission electromagnetic radiation, emitted in response to first excitation of the number of emitters, and by determining data indicative of an optical property of the security element using a second emission electromagnetic radiation, emitted in response to second, different, excitation of the number of emitters;
    wherein the optical reader determines the unique identifier from a map of a variation in determined data indicative of an optical property with respect to the excitation, and verifies that the number of emitters is a quantum system and complex at the atomic scale, based on the variation in determined data.

12. A method of authenticating, comprising:
optically reading a security element, the security element comprising a number of emitters that are each capable of exhibiting a different emission response to excitation of the number of emitters;
the reading comprising determining data indicative of an optical property of the security element using first emission electromagnetic radiation, emitted in response to first excitation of the number of emitters;
the authenticating further comprising comparing the determined data indicative of an optical property with a unique identifier determined using a process including determining data indicative of an optical property of the security element using a second emission electromagnetic radiation, emitted in response to second, different, excitation of the number of emitters, wherein the unique identifier is determined from a map of a variation in determined data indicative of an optical property with respect to the excitation of the number of emitters; or
determining data indicative of an optical property of the security element using second emission electromagnetic radiation, emitted in response to a second, different, excitation of the number of emitters; the authenticating being based on a variation in determined data indicative of an optical property with respect to the different excitation of the number of emitters, wherein the authenticating is based on verifying that the number of emitters is a quantum system and complex at the atomic scale, based on the variation in determined data.

13. The method of claim 12, wherein the method is undertaken for at least one of:
excitation different to that previously used, or to be used subsequently;
one or more locations on the security element different to those previously used, or to be used subsequently; or
one or more emitters of the security element different to those previously used, or to be used subsequently.

14. The method of claim 13, wherein authentication is only allowable if, and is optionally actively prevented unless, the method is undertaken for at least one of:
excitation different to that previously used, or to be used subsequently;
one or more locations on the security element different to those previously used, or to be used subsequently; or
one or more emitters of the security element different to those previously used, or to be used subsequently.

15. The method of claim 12, wherein the authenticating is based on verifying that the variation in determined data is indicative of a logarithmic excitation-emission intensity relationship.

16. A system for authenticating, the system comprising:
one or more excitation sources for generating an excitation for use with the security element, the security element comprising a number of emitters that are each capable of exhibiting a different emission response to the excitation; and
an optical reader, for optically reading the security element by determining data indicative of an optical property of the security element using emission electromagnetic radiation, emitted in response to excitation of the number of emitters;
the system being arranged to determine data indicative of an optical property of the security element using second an emission electromagnetic radiation, emitted in response to second, different, excitation of the number of emitters; the authenticating being based on a variation in determined data indicative of an optical property with respect to the different excitation of the number of emitters, and the number of emitters being a quantum system and complex at the atomic scale.

17. A method of authenticating, comprising:
optically reading a security element, the security element comprising a number of emitters that are each capable of exhibiting a different emission response to excitation of the number of emitters;
the reading comprising determining data indicative of an optical property of the security element using first emission electromagnetic radiation, emitted in response to first excitation of the number of emitters;
the authenticating further comprising comparing the determined data indicative of an optical property with a unique identifier determined using a process including determining data indicative of an optical property of the security element using a second emission electromagnetic radiation, emitted in response to second, different, excitation of the number of emitters, wherein the unique identifier is determined from a map of a variation in determined data indicative of an optical property with respect to the excitation of the number of emitters; or
determining data indicative of an optical property of the security element using second emission electromagnetic radiation, emitted in response to a second, different, excitation of the number of emitters; the authenticating being based on a variation in determined data indicative of an optical property with respect to the different excitation of the number of emitters, wherein the authenticating is based on verifying that the variation in determined data is indicative of a logarithmic excitation-emission intensity relationship.

18. A method of determining a unique identifier for a security element, the method comprising:
optically reading the security element, the security element comprising a number of emitters that are each capable of exhibiting a different emission response to an excitation of the number of emitters;
the reading comprising determining data indicative of an optical property of the security element using first a emission electromagnetic radiation, emitted in response to first excitation of the number of emitters, and determining data indicative of an optical property of the security element using a second emission electromagnetic radiation, emitted in response to second, different, excitation of the number of emitters, wherein the unique identifier is determined from a map of a variation in determined data indicative of an optical property with respect to the excitation of the number of emitters; and
verifying that the variation in determined data is indicative of a logarithmic excitation-emission intensity relationship.

19. A method of authenticating, comprising:
optically reading a security element, the security element comprising a number of emitters that are each capable of exhibiting a different emission response to excitation of the number of emitters;
the reading comprising determining data indicative of an optical property of the security element using first emission electromagnetic radiation, emitted in response to first excitation of the number of emitters;
the authenticating further comprising comparing the determined data indicative of an optical property with a unique identifier determined using a process including determining data indicative of an optical property of the security element using a second emission electromagnetic radiation, emitted in response to second, different, excitation of the number of emitters, wherein the unique identifier is determined from a map of a variation in determined data indicative of an optical property with respect to the excitation of the number of emitters; or determining data indicative of an optical property of the security element using second emission electromagnetic radiation, emitted in response to a second, different, excitation of the number of emitters; the authenticating being based on a variation in determined data indicative of an optical property with respect to the different excitation of the number of emitters, wherein the method is undertaken for at least one of:

excitation different to that previously used, or to be used subsequently;

one or more locations on the security element different to those previously used, or to be used subsequently; or one or more emitters of the security element different to those previously used, or to be used subsequently.

20. A system for authenticating, the system comprising:

one or more excitation sources for generating an excitation for use with the security element, the security element comprising a number of emitters that are each capable of exhibiting a different emission response to the excitation; and an optical reader, for optically reading the security element by determining data indicative of an optical property of the security element using emission electromagnetic radiation, emitted in response to excitation of the number of emitters;

the system being arranged to determine data indicative of an optical property of the security element using second emission electromagnetic radiation, emitted in response to second, different, excitation of the number of emitters; the authenticating being based on a variation in determined data indicative of an optical property with respect to the different excitation of the number of emitters, and the variation in determined data being indicative of a logarithmic excitation-emission intensity relationship.

* * * * *